US012565193B2

(12) United States Patent
Itoh et al.

(10) Patent No.: US 12,565,193 B2
(45) Date of Patent: *Mar. 3, 2026

(54) VEHICLE CONVEYANCE MANAGEMENT SYSTEM AND VEHICLE CONVEYANCE MANAGEMENT METHOD AND STORAGE MEDIUM

(71) Applicant: TOYOTA JIDOSHA KABUSHIKI KAISHA, Aichi-ken (JP)

(72) Inventors: Masayuki Itoh, Nagoya (JP); Iwao Maeda, Nagoya (JP); Tatsuya Sugano, Susono (JP); Norinao Watanabe, Susono (JP); Yutaka Nakamura, Susono (JP); Yoshikazu Jikuhara, Susono (JP); Yuki Nishikawa, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 330 days.

This patent is subject to a terminal disclaimer.

(21) Appl. No.: 18/297,642

(22) Filed: Apr. 10, 2023

(65) Prior Publication Data

US 2023/0322210 A1     Oct. 12, 2023

(30) Foreign Application Priority Data

Apr. 11, 2022     (JP) ................................. 2022-065166

(51) Int. Cl.
*B60W 30/06*          (2006.01)
(52) U.S. Cl.
CPC ................................. *B60W 30/06* (2013.01)

(58) Field of Classification Search
CPC ............ B60W 30/06; E04H 6/30; G08G 1/14
See application file for complete search history.

(56) References Cited

U.S. PATENT DOCUMENTS

| 10,042,359 | B1 | 8/2018 | Konrardy et al. |
| 2016/0115702 | A1 | 4/2016 | Nordbruch et al. |

(Continued)

FOREIGN PATENT DOCUMENTS

| CN | 107025491 A | 8/2017 |
| CN | 209665379 U | 11/2019 |

(Continued)

OTHER PUBLICATIONS

Chan, The State of the Art of Electric Hybrid and Fuel Cell Vehicles (Apr. 2007), Proceedings of the IEEE, vol. 95, Issue: 4 (Year: 2007).

(Continued)

*Primary Examiner* — Luke Huynh
(74) *Attorney, Agent, or Firm* — HAUPTMAN HAM, LLP

(57)          ABSTRACT

In an automated parking lot in which manual driving vehicles and automated driving vehicles can park, when entering the automated parking lot, the manual driving vehicle is conveyed by a vehicle conveyance robot to an empty parking space. When an automated driving vehicle breaks down and stops in the automated parking lot, the manual driving vehicle being conveyed is unloaded from the vehicle conveyance robot and the broken down automated driving vehicle is loaded on the vehicle conveyance robot. Due to this, the broken down automated driving vehicle is recovered by the vehicle conveyance robot.

15 Claims, 16 Drawing Sheets

(56)        References Cited

U.S. PATENT DOCUMENTS

| | | | |
|---|---|---|---|
| 2021/0197702 A1 | 7/2021 | Krishnamurthi | |
| 2022/0180747 A1* | 6/2022 | Hidaka | G06Q 50/40 |
| 2022/0326718 A1* | 10/2022 | Cord | E04H 6/182 |
| 2023/0220697 A1* | 7/2023 | Monteverdi | A47L 23/205 |
| | | | 701/25 |

FOREIGN PATENT DOCUMENTS

| | | | |
|---|---|---|---|
| CN | 114303182 A | 4/2022 |
| JP | WO2021039406 A1 | 12/2021 |

OTHER PUBLICATIONS

Office Action in U.S. Appl. No. 18/297,654, mailed Apr. 22, 2025, 36pp.

\* cited by examiner

FIG. 10

| VEHICLE CONVEYANCE ROBOT NO. | CURRENT STATE |
|---|---|
| No. 1 | $X_3$ |
| No. 2 | $Y_4$ |
| ⋮ | ⋮ |
| No. S | $R_0$ |

FIG. 11

| | No. | State of vehicle conveyance robot |
|---|---|---|
| Time of lot entry | $R_0$ | Standing by at standby location |
| | $X_1$ | Running toward vehicle loading ready position of passenger platform |
| | $X_2$ | Stopping for vehicle loading ready processing at passenger platform |
| | $X_3$ | Running toward vehicle unloading position at parking space |
| | $X_4$ | Stopping for vehicle unloading processing at parking space |
| | $X_5$ | Running for returning to standby location |
| Time of lot exit | $R_0$ | Standing by at standby location |
| | $Y_1$ | Running toward vehicle loading ready position of parking space |
| | $Y_2$ | Stopping for vehicle loading processing at parking space |
| | $Y_3$ | Running toward vehicle unloading position at passenger platform |
| | $Y_4$ | Stopping for vehicle unloading processing at passenger platform |
| | $Y_5$ | Running for returning to standby location |
| Time of occurrence of broken down vehicle | $Z_1$ | Temporarily stopping for heading to recovery of broken down vehicle |
| | $Z_2$ | Running toward vehicle unloading position of temporary parking space |
| | $Z_3$ | Stopping for vehicle unloading processing at temporary parking space |
| | $Z_4$ | Running toward loading ready position of broken down vehicle |
| | $Z_5$ | Stopping for loading processing of broken down vehicle |
| | $Z_6$ | Running toward vehicle unloading position of parking space of broken down vehicle |
| | $Z_7$ | Stopping for vehicle unloading processing at parking space of broken down vehicle |

VEHICLE CONVEYANCE MANAGEMENT SYSTEM AND VEHICLE CONVEYANCE MANAGEMENT METHOD AND STORAGE MEDIUM

RELATED APPLICATIONS

The present application claims priority of Japanese Patent Application No. 2022-065166 filed Apr. 11, 2022, the disclosure of which is hereby incorporated by reference herein in its entirety.

FIELD

The present invention relates to a vehicle conveyance management system and a vehicle conveyance management method and storage medium.

BACKGROUND ART

Known in the art is a method for operating an automated towing robot designed to tow a broken down automated driving vehicle to a preset location using a standing by automated towing robot when, for example, an automated driving vehicle breaks down on a vehicle parking lot (for example, see U.S. Patent Application Publication No. 2016/0115702).

SUMMARY

In this regard, when there is a request for conveyance of a vehicle by a vehicle conveyance robot, if a vehicle conveyance robot in the middle of conveying another vehicle is running near the vehicle for which conveyance was requested, rather than making a vehicle conveyance robot move from the standby location of vehicle conveyance robots, utilizing the vehicle conveyance robot in the middle of conveying another vehicle to convey the vehicle for which conveyance was requested can be said to be preferable since it would be possible to use the vehicle conveyance robot to convey the vehicle for which conveyance was requested in a short time from the request for conveyance.

However, the above patent literature does not at all disclose such a thing.

Therefore, according to the present invention, there is provided a vehicle conveyance management system comprising:

an automated driving vehicle conveyance robot for conveying a vehicle, and a management server for managing operation of the vehicle conveyance robot, wherein when there is a request for conveyance of another vehicle during conveyance of one vehicle by the vehicle conveyance robot, the one vehicle being conveyed is unloaded from the vehicle conveyance robot and the other vehicle is loaded onto the vehicle conveyance robot to recover the other vehicle by the vehicle conveyance robot.

Furthermore, according to the present invention, there is provided a vehicle conveyance management method comprising:

unloading one vehicle being conveyed from a vehicle conveyance robot for conveying a vehicle and loading another vehicle on to the vehicle conveyance robot and recovering the other vehicle by the vehicle conveyance robot when there was a request for conveyance of the other vehicle during conveyance of the one vehicle by the vehicle conveyance robot.

Furthermore, according to the present invention, there is provided a non-transitory computer-readable storage medium storing a program that causes a computer to:

unload one vehicle being conveyed from a vehicle conveyance robot for conveying a vehicle and load another vehicle on to the vehicle conveyance robot and recover the other vehicle by the vehicle conveyance robot when there was a request for conveyance of the other vehicle during conveyance of the one vehicle by the vehicle conveyance robot.

According to the present invention, it becomes possible to use a vehicle conveyance robot to convey a vehicle for which a request for conveyance has been made in a short time from the request for conveyance.

BRIEF DESCRIPTION OF DRAWINGS

FIG. 10 is a view showing current states of a vehicle conveyance robot.

FIG. 11 is a view showing a list of current states of a vehicle conveyance robot.

DESCRIPTION OF EMBODIMENTS

Figure 1:
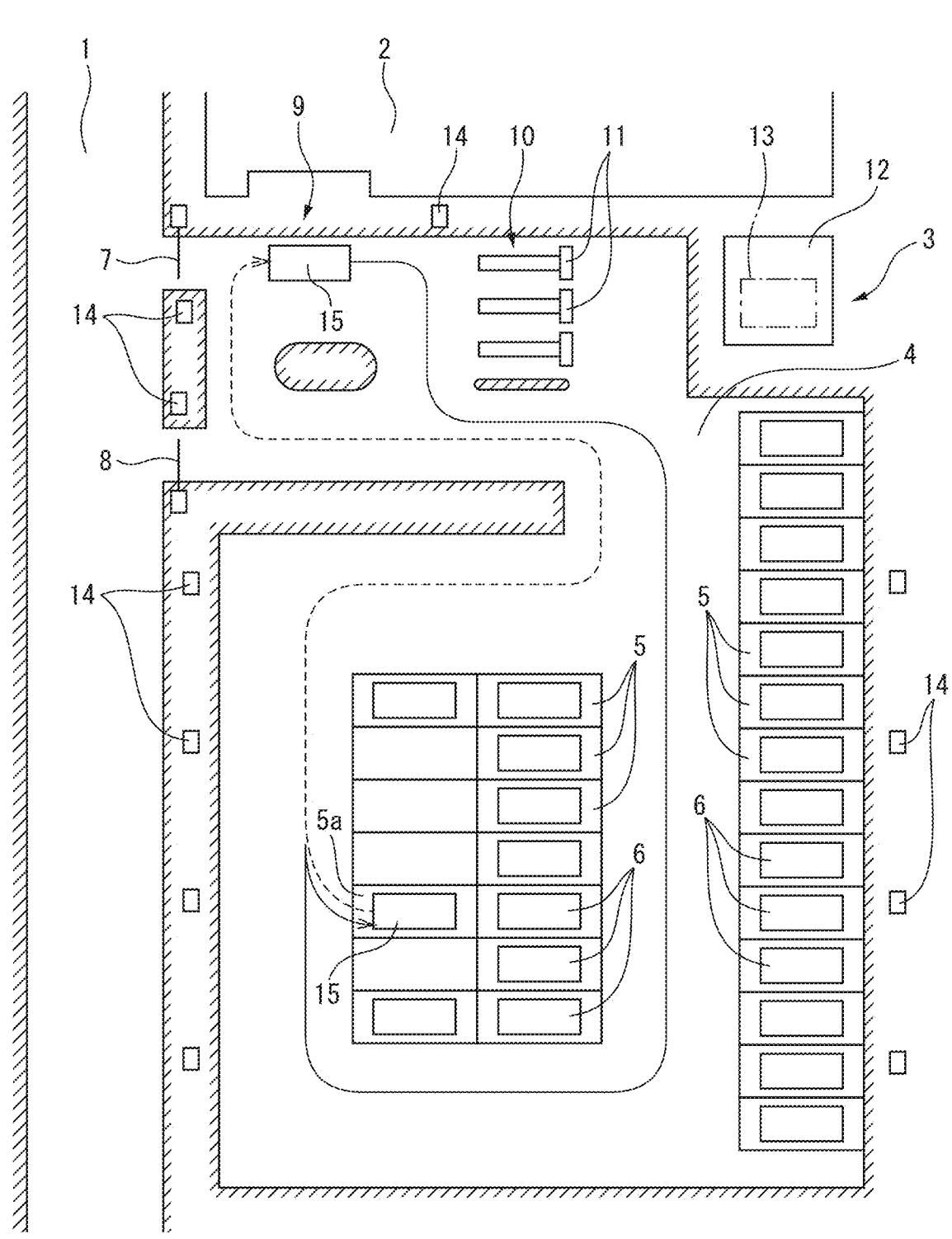
FIG. 1 is a plan view schematically showing an automated parking lot.
Figure 2:
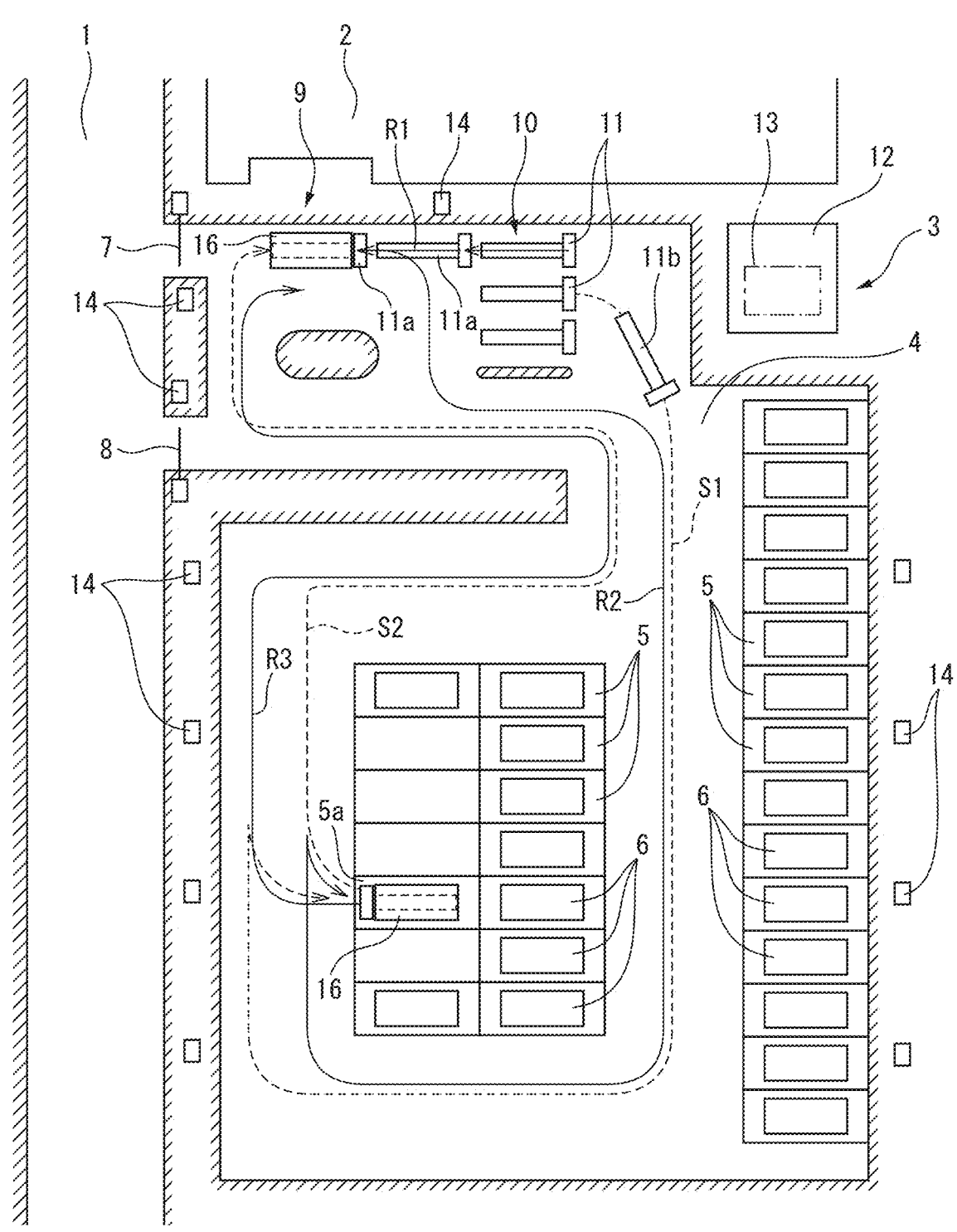
FIG. 2 is a plan view schematically showing an automated parking lot.
Figure 3:
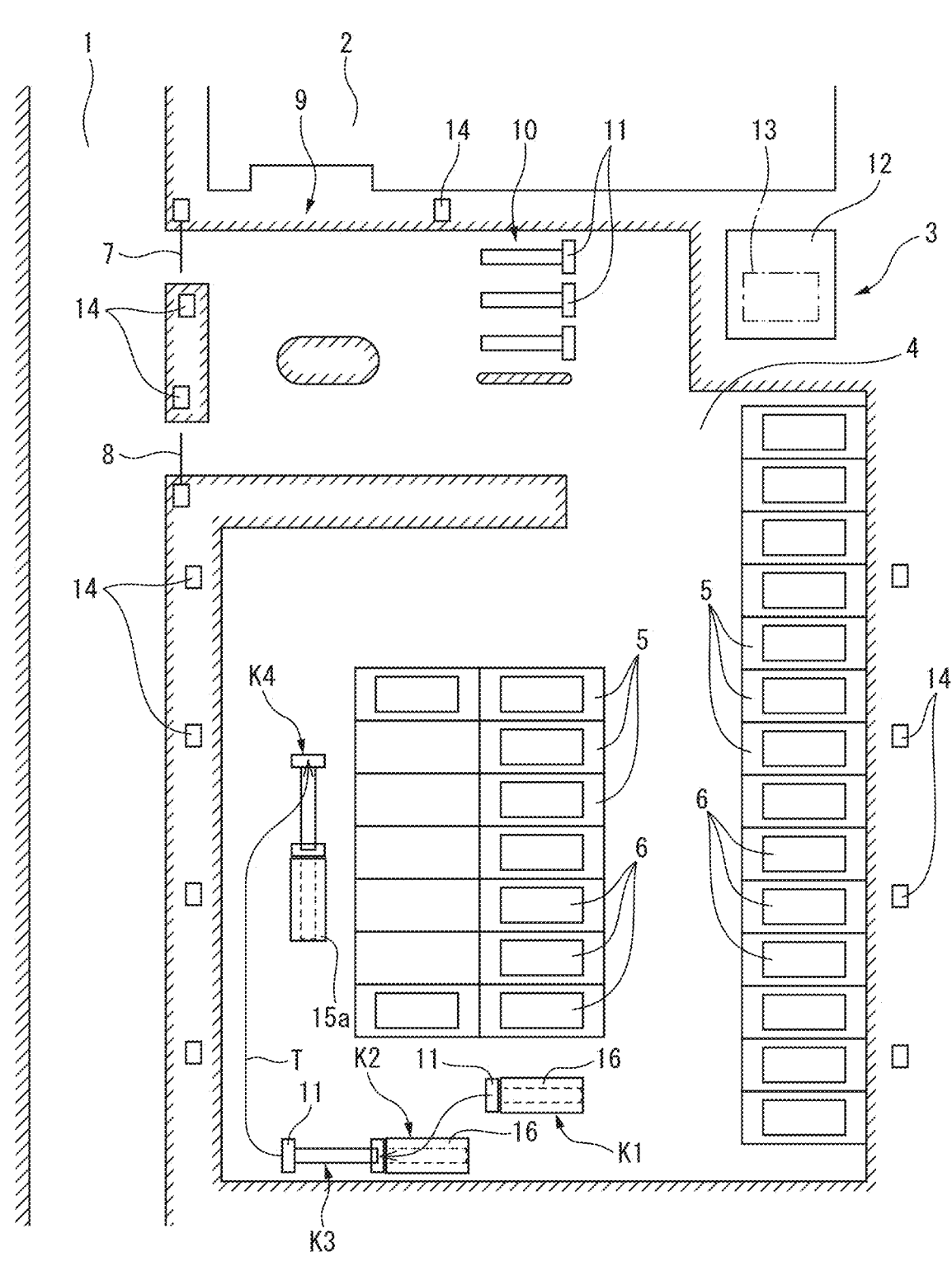
FIG. 3 is a plan view schematically showing an automated parking lot.

FIG. 1 to FIG. 3 are plan views schematically showing the same automated parking lot. Referring to FIG. 1 to FIG. 3, 1 indicates a road, 2 a department store or other facility, 3 an automated parking lot, 4 a parking lot region of the automated parking lot 3, 5 a plurality of parking spaces set inside the parking lot region 4, 6 vehicles already parked at the parking spaces 5, 7 an entry gate to the parking lot region 4, 8 an exit gate from the parking lot region 4, 9 a passenger platform, 10 a standby location of vehicle conveyance robots for conveying a vehicle, 11 a large number of vehicle conveyance robots standing by at the standby location 10, and 12 a parking management facility. Inside this parking management facility 12, a lot entry/exit management server 13 is installed for managing lot entry and lot exit.

Further, as shown in FIG. 1 to FIG. 3, at the automated parking lot 3, a large number of infrastructure sensors 14 are arranged for identifying vehicles entering the automated parking lot 3 and vehicles exiting the automated parking lot 3, detecting fixed structures and moving objects inside the parking lot region 4, and detecting the parked states of vehicles in the parking lot region 4. As these infrastructure sensors 14, cameras or laser sensors etc. may be used. In this case, for example, if cameras are used as the infrastructure sensors 14, the image signals captured by the infrastructure sensors 14 are sent to the lot entry/exit management server 13 installed in the parking management facility 12.

At the automated parking lot 3 shown in FIG. 1 to FIG. 3, when there is a request for lot entry for the automated driving vehicle, after the passengers are dropped off from the automated driving vehicle at the passenger platform 9, the automated driving vehicle is made to move by automated driving to the empty parking space 5. When there is a request for lot exit for the automated driving vehicle, the automated driving vehicle parked at a parking space 5 is made to move by automated driving to the passenger platform 9. On the other hand, when there is a request for lot entry for the manual driving vehicle, after the passengers exit the manual driving vehicle at the passenger platform 9, the manual driving vehicle is conveyed by the automated driving vehicle conveyance robot 11 to the empty parking space 5, while when there is a request for lot exit for the manual driving vehicle, the manual driving vehicle parked at the parking space 5 is conveyed by the automated driving vehicle conveyance robot 11 to the passenger platform 9.

In this way, at the automated parking lot 3 shown in FIG. 1 to FIG. 3, an automated parking service, that is, an auto valet parking service, able to automatically park the manual driving vehicle and automated driving vehicle, is performed. In FIG. 1, an example of a lot entry/exit action in the case where the parking space 5 designated for the automated driving vehicle 15 for which lot entry is requested was the parking space 5a is schematically shown by the arrow, while in FIG. 2, an example of a lot entry/exit action in the case where the parking space 5 designated for the manual driving vehicle 16 for which lot entry is requested was the parking space 5a is schematically shown by the arrow.

That is, at the time of lot entry of the automated driving vehicle 15, if the automated driving vehicle 15 arrives at the passenger platform 9 and the passengers exit the automated driving vehicle 15, the automated driving vehicle 15 is made to move by automated driving to the parking space 5a as shown by the solid arrow in FIG. 1 and is parked at the parking space 5a. On the other hand, at the time of lot exit of the automated driving vehicle 15, the automated driving vehicle 15 parked at the parking space 5a is made to move by automated driving from the parking space 5a to the passenger platform 9 as shown by the broken arrow in FIG. 1.

On the other hand, at the time of lot entry of the manual driving vehicle 16, if the manual driving vehicle 16 arrives at the passenger platform 9 and the passengers exit the manual driving vehicle 16, as shown by the solid arrow R1 in FIG. 2, one vehicle conveyance robot 11a of the vehicle conveyance robots 11 standing by at the standby location 10 is made to move by automated driving toward the manual driving vehicle 16 and the manual driving vehicle 16 stopped at the passenger platform 9 is loaded on the vehicle conveyance robot 11a. Next, the vehicle conveyance robot

11a carrying the manual driving vehicle 16 is made to move by automated driving to the parking space 5a as shown by the solid arrow R2 in FIG. 2. At the parking space 5a, the carried manual driving vehicle 16 is unloaded from the vehicle conveyance robot 11a. Next, the empty vehicle conveyance robot 11a which unloaded the manual driving vehicle 16 is returned by automated driving to the standby location 10 as shown by the solid arrow R3 in FIG. 1.

Further, at the time of lot exit of the manual driving vehicle 16, one vehicle conveyance robot 11b of the vehicle conveyance robots 11 standing by at the standby location 10 is made to move by automated driving toward the parking space 5a as shown by the broken arrow S1 in FIG. 2 and the manual driving vehicle 16 stopped at the parking space 5a is loaded on the vehicle conveyance robot 11b. Next, the vehicle conveyance robot 11b carrying the manual driving vehicle 16 is made to move by automated driving to the passenger platform 9 as shown by the broken arrow S2 in FIG. 2. At the passenger platform 9, the carried manual driving vehicle 16 is unloaded from the vehicle conveyance robot 11b. Next, the empty vehicle conveyance robot 11b which unloaded the manual driving vehicle 16 is returned by automated driving to the standby location 10.

Figure 4:
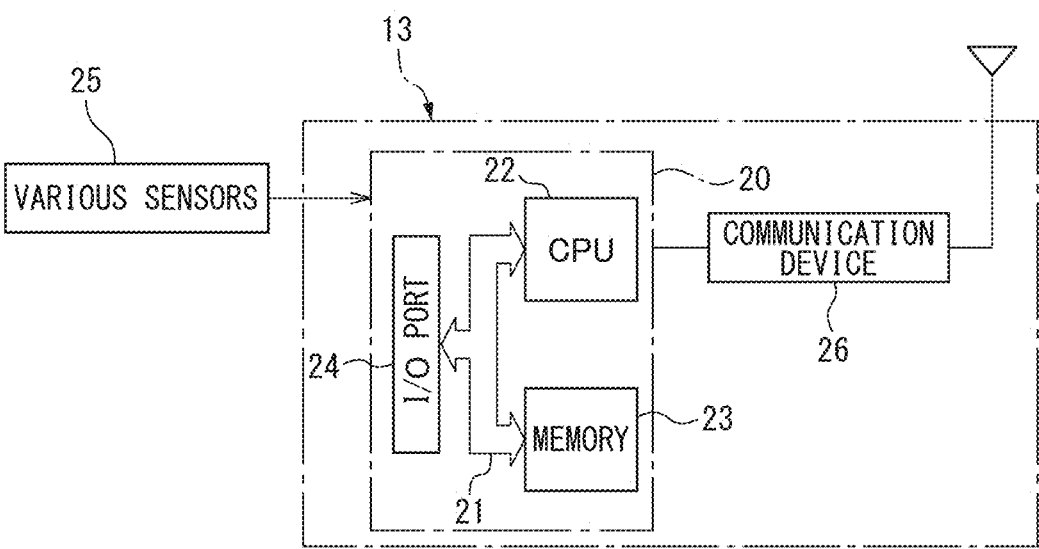
FIG. 4 is a view schematically showing a lot entry/exit management server.

Next, the lot entry/exit management server 13, automated driving vehicle 15, and vehicle conveyance robot 11 shown in FIG. 1 and FIG. 2 will be explained in that order. FIG. 4 shows the lot entry/exit management server 13 shown in FIG. 1. Referring to FIG. 4, an electronic control unit 20 is provided inside the lot entry/exit management server 13. This electronic control unit 20 is comprised of a digital computer provided with a CPU (microprocessor) 22, a memory 23 comprised of a ROM and RAM, and an input/output port 24, which are connected with each other by a bidirectional bus 21. As shown in FIG. 4, the detection signals of various sensors 25 including the infrastructure sensors 14 are input into the electronic control unit 20. Further, the map data of the parking lot region 4 is stored inside the memory 23 of the electronic control unit 20.

Figure 5:
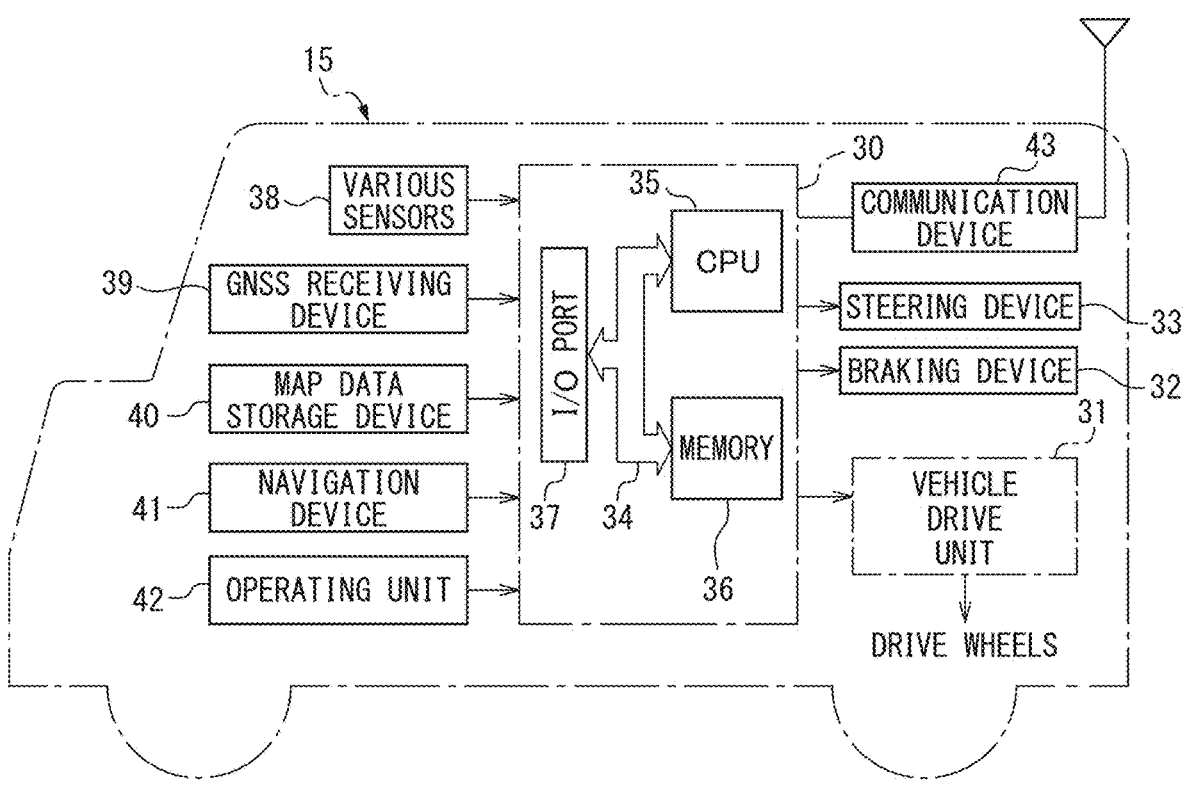
FIG. 5 is a view schematically showing an automated driving vehicle.

FIG. 5 schematically shows one example of the automated driving vehicle 15 shown in FIG. 1. Referring to FIG. 5, 30 indicates an electronic control unit mounted in the automated driving vehicle 15, 31 a vehicle drive unit comprised of for example an electric motor for applying drive force to the drive wheels of the automated driving vehicle 15, 32 is a braking device for braking the automated driving vehicle 15, and 33 is a steering device for steering the automated driving vehicle 15. As shown in FIG. 5, the electronic control unit 30 is comprised of a digital computer provided with a CPU (microprocessor) 35, a memory 36 comprised of a ROM and RAM, and an input/output port 37, which are connected with each other by a bidirectional bus 34. On the other hand, various sensors 38 necessary for the automated driving vehicle 15 to be automatically driven, that is, sensors for detecting the state of the automated driving vehicle 15 and periphery detection sensors for detecting the periphery of the automated driving vehicle 15 are attached to the automated driving vehicle 15. In this case, as the sensors for detecting the state of the automated driving vehicle 15, an acceleration sensor, speed sensor, and azimuth sensor are used. As periphery detection sensors for detecting the periphery of the automated driving vehicle 15, vehicle-mounted cameras for capturing the front, sides, and rear of the vehicle conveyance robot 11, LIDAR, radar, etc. are used.

Further, the automated driving vehicle 15 is provided with a GNSS (Global Navigation Satellite System) receiving device 39, map data storage device 40, navigation device 41, and operating unit 42 for performing various operations. The GNSS receiving device 39 can detect the current position of the automated driving vehicle 15 (for example, the latitude and longitude of the automated driving vehicle 15) based on information obtained from a plurality of satellites. Therefore, it is possible to acquire the current position of the automated driving vehicle 15 by this GNSS receiving device 39. As this GNSS receiving device 39, for example, a GPS receiving device is used. On the other hand, in the map data storage device 40, map data etc. required for the automated driving vehicle 15 to be automatically driven are stored. These various sensors 38, GNSS receiving device 39, map data storage device 40, navigation device 41, and operating unit 42 are connected to the electronic control unit 30. Further, a communication device 43 for communicating with the lot entry/exit management server 13 is mounted at the automated driving vehicle 15 and, as shown in FIG. 4, a communication device 26 for communicating with the automated driving vehicle 15 is provided inside the lot entry/exit management server 13.

Figure 6A:
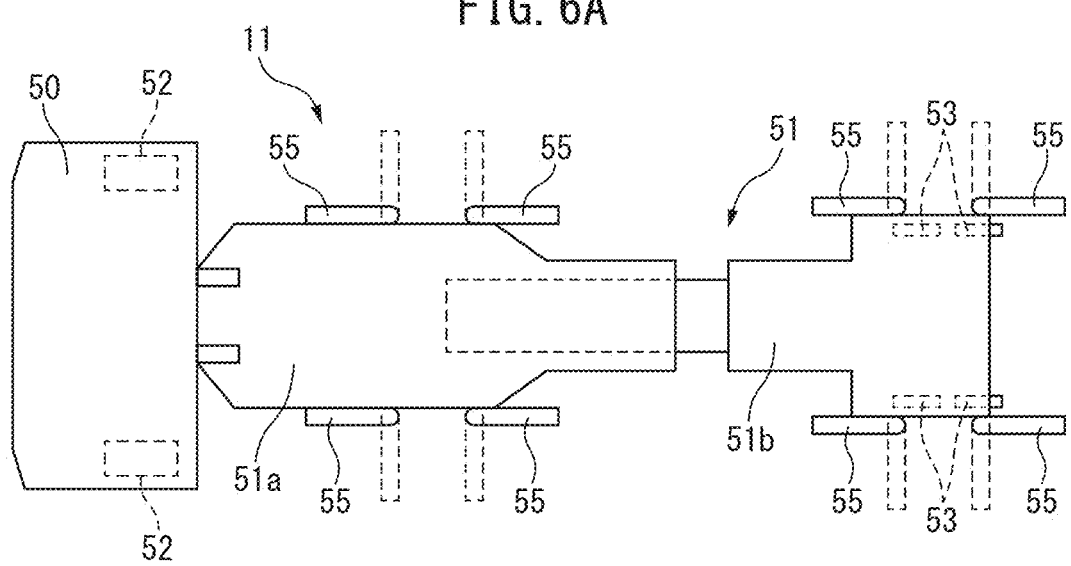
FIG. 6A, FIG. 6B, and FIG. 6C are views schematically showing a vehicle conveyance robot 11.
Figure 6B:
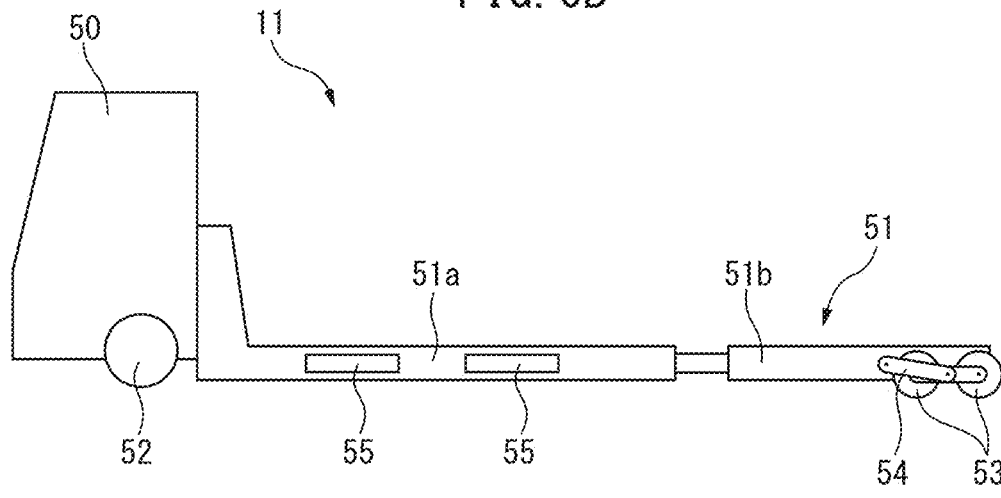
Figure 6C:
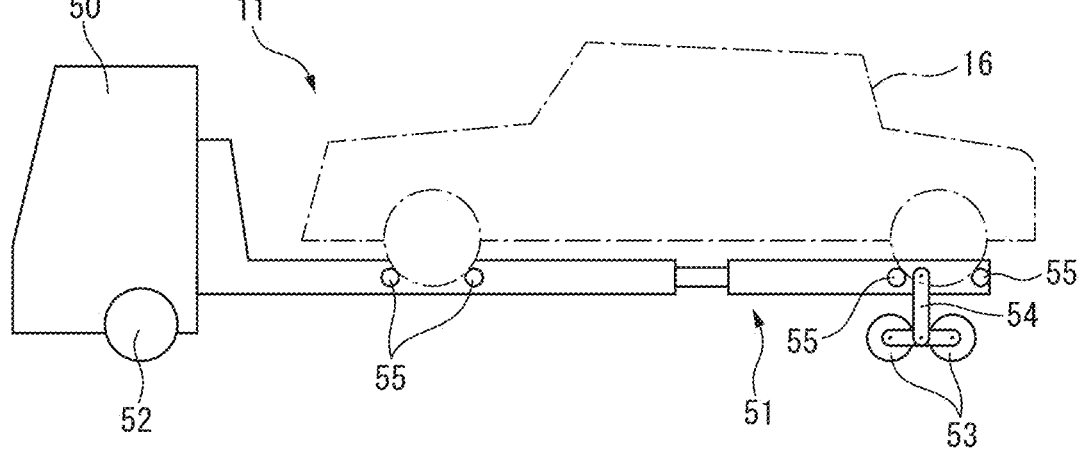

FIG. 6A shows a plan view schematically showing the vehicle conveyance robot 11 shown in FIG. 2, while FIG. 6B and FIG. 6C show side views of the vehicle conveyance robot 11 shown in FIG. 6A. Referring to FIG. 6A, FIG. 6B, and FIG. 6C, 50 indicates a conveyance robot head, 51 a bed part connected to the conveyance robot head 50 and able to ascend or descend in the vertical direction, 52 front wheels comprised of drive wheels, 53 rear wheels comprised of driven wheels, and 54 a lift link device arranged between the rear wheels 53 and the bed part 51. The bed part 51 is comprised of a front bed part 51a and a rear bed part 51b slidingly coupled with the front bed part 51a.

As shown in FIG. 6A, at both sides of the front bed part 51a and the rear bed part 51b, pairs of wheel support arms 55 able to swing 90 degrees from the retracted positions shown by the solid lines to the projecting positions shown by the broken lines are arranged. The swinging motion of the pairs of arms 55 and the sliding motion of the rear bed part 51b with respect to the front bed part 51a are performed by hydraulic cylinders or electric motors. On the other hand, the bed part 51 is controlled to rise or descend between the descended position shown in FIG. 6B and the ascended position shown in FIG. 6C. In this case, at the connecting part of the front bed part 51a and the conveyance robot head 50, a hydraulic cylinder or electric motor for bed lift control is provided. The bed part 51 is controlled to rise or descend by the hydraulic cylinder or electric motor for bed lift control and the hydraulic cylinder or electric motor for driving the lift link device 54.

Figure 7A:
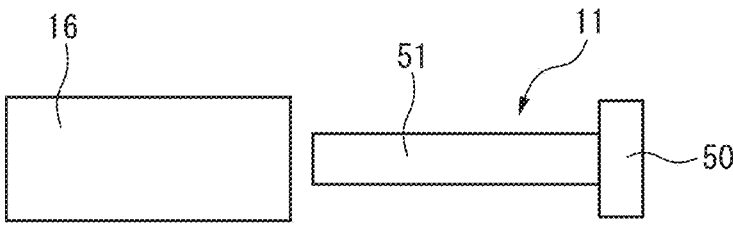
FIG. 7A and FIG. 7B are views for explaining the work of loading a manual driving vehicle at a vehicle conveyance robot.
Figure 7B:
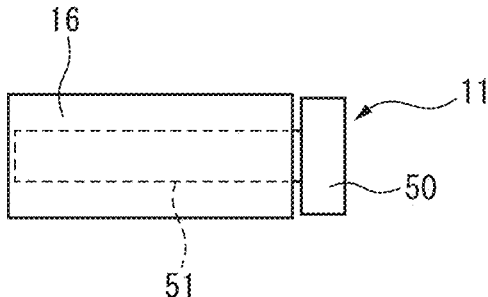

When loading the manual driving vehicle 16 on the vehicle conveyance robot 11, as shown by the solid line in FIG. 6A, the pairs of arms 55 are held at the retracted positions and, as shown in FIG. 6B, the bed part 51 is held at the descended position. Next, in such a state, the vehicle conveyance robot 11, as shown in FIG. 7A, is made to move to the vehicle loading ready position where the bed part 51 is aligned with the longitudinal axis of the manual driving vehicle 16. Next, the vehicle conveyance robot 11 is made to retract and, as shown in FIG. 7B, the bed part 51 enters below the manual driving vehicle 16. Next, all of the arms 55 are made to swing to the projected positions, then the bed part 51 is made to rise. If the bed part 51 is made to rise, all of the wheels of the manual driving vehicle 16 are supported by the corresponding pairs of arms 55. Due to this, the manual driving vehicle 16 is loaded on the vehicle conveyance robot 11. Note that, the interval between the front bed part 51a and the rear bed part 51b is adjusted in accordance with the wheel base of the loaded manual driving vehicle 16.

Figure 8A:
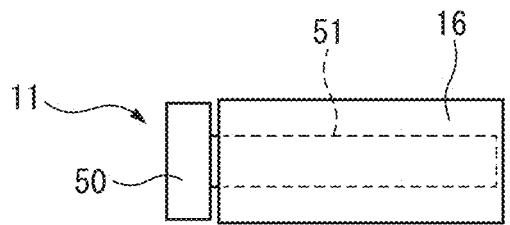
FIG. 8A and FIG. 8B are views for explaining the work of unloading a manual driving vehicle from a vehicle conveyance robot.
Figure 8B:
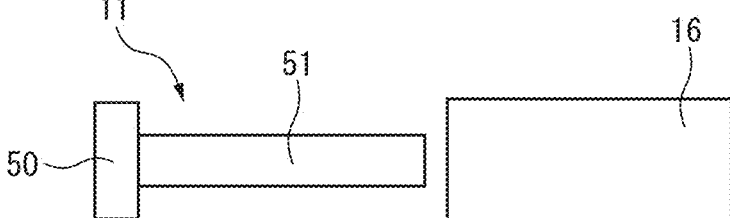

On the other hand, when unloading the manual driving vehicle 16 from the vehicle conveyance robot 11, the vehicle conveyance robot 11 is made to move to the unloading position. This time is shown in FIG. 8A. Next, the bed part 51 is made to descend and the carried manual driving vehicle 16 is lowered to the ground surface. Next, all of the arms 55 are made to swing to the retracted positions. Next, the vehicle conveyance robot 11 is made to advance in the state with the bed part 51 aligned with the longitudinal axis of the manual driving vehicle 16 and, as shown in FIG. 8B, is made to move to the running ready position where the bed part 51 has completely pulled out from below the manual driving vehicle 16.

Figure 9:
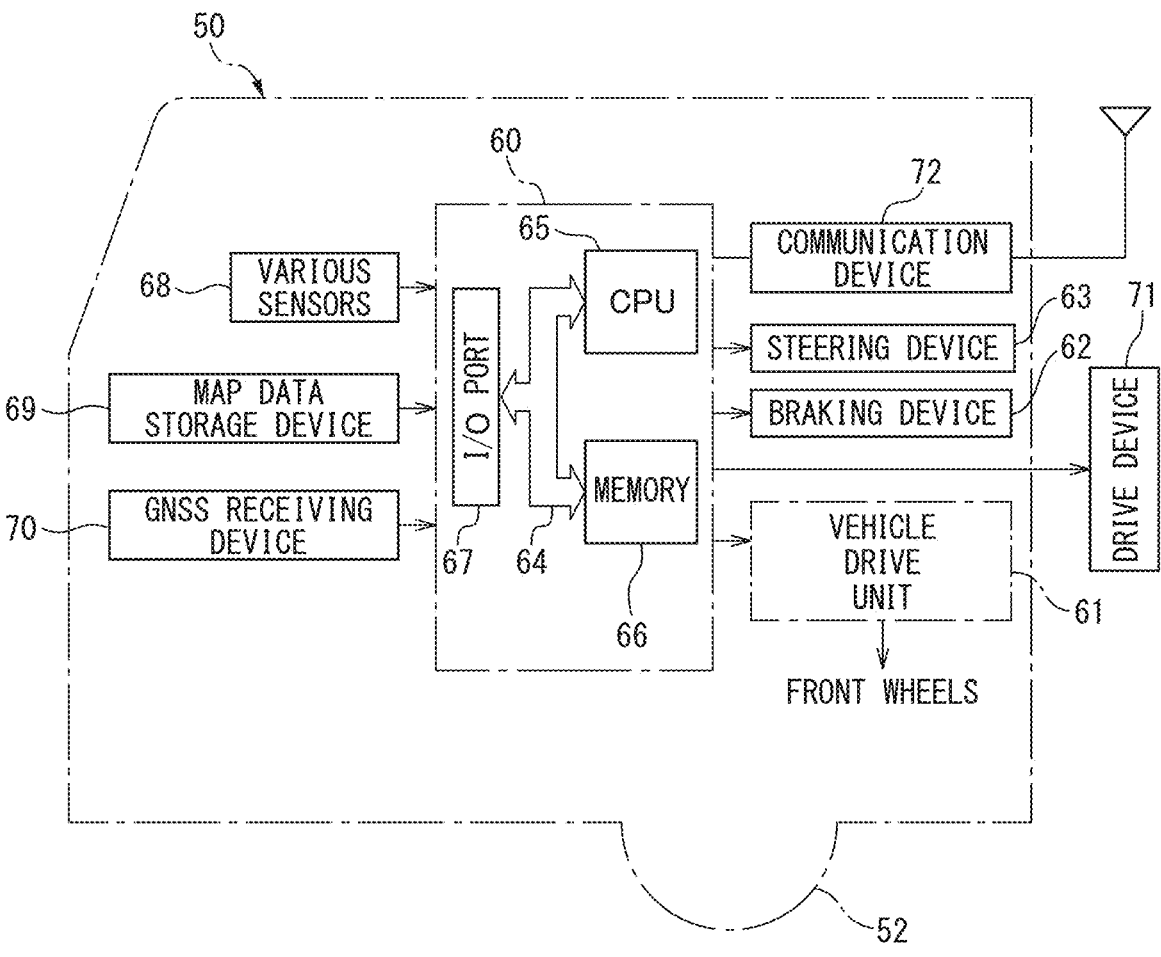
FIG. 9 is a view schematically showing a conveyance robot head of a vehicle conveyance robot.

FIG. 9 schematically shows one example of the conveyance robot head 50 of the vehicle conveyance robot 11 shown in FIG. 6A, FIG. 6B, and FIG. 6C. Referring to FIG. 9, 60 indicates an electronic control unit mounted inside the conveyance robot head 50, 61 a vehicle drive unit comprised of, for example, an electric motor for applying drive force to the front wheels 52 of the vehicle conveyance robot 11, 62 is a braking device for braking the vehicle conveyance robot 11, and 63 is a steering device for steering the front wheels 52. As shown in FIG. 9, the electronic control unit 60 is comprised of a digital computer provided with a CPU (microprocessor) 65, a memory 66 comprised of a ROM and RAM, and an input/output port 67, which are connected with each other by a bidirectional bus 64. On the other hand, the vehicle conveyance robot 11 has various sensors 68 required for the vehicle conveyance robot 11 to be automatically driven, that is, sensors for detecting the state of the vehicle conveyance robot 11 and periphery detection sensors for detecting the periphery of the vehicle conveyance robot 11, arranged at it. In this case, as the sensors for detecting the state of the vehicle conveyance robot 11, an acceleration sensor, speed sensor, and azimuth sensor are used. As periphery detection sensors for detecting the periphery of the vehicle conveyance robot 11, vehicle-mounted cameras for capturing the front, sides, and rear of the vehicle conveyance robot 11, LIDAR, radar, etc. are used.

Further, the conveyance robot head 50 is provided with a map data storage device 69 and GNSS receiving device 70. This GNSS receiving device 70 can detect the current position of the vehicle conveyance robot 11 (for example, the latitude and longitude of the vehicle conveyance robot 11) based on information obtained from a plurality of satellites. In the map data storage device 69, map data etc. of the parking lot region 4 required for the vehicle conveyance robot 11 to be automatically driven are stored. These various sensors 68, map data storage device 69, and GNSS receiving device 70 are connected to the electronic control unit 60. Further, the hydraulic cylinder or electric motor or other drive device 71 for control of lift of the bed part 51 and control of swing of the arms 55 are connected to the electronic control unit 60. Further, a communication device 72 is carried on the conveyance robot head 50 for communicating with the lot entry/exit management server 13.

Next, referring to FIG. 1, the lot entry/exit work of the automated driving vehicle 15 at the automated parking lot 3 will be explained in a bit more detail. In an embodiment of the present invention, when a user utilizing the automated parking service parks his or her own automated driving vehicle 15 at the automated parking lot 3, for example, when the automated driving vehicle 15 reaches the passenger platform 9, for example, the lot entry request is sent together with the vehicle ID for identifying the vehicle from the mobile terminal of the user through the communication network to the lot entry/exit management server 13. If the lot entry/exit management server 13 receives the lot entry request, the lot entry/exit management server 13 sets the running route of the vehicle enabling the vehicle to reach the set parking space 5a from the passenger platform 9 as shown by the solid arrow in FIG. 1 without contacting other vehicles or pedestrians and sends this set running route to the automated driving vehicle 15 of the user. If the automated driving vehicle 15 of the user receives the set running route from the lot entry/exit management server 13, the automated driving vehicle 15 of the user is made to move along this set running route by automated driving from the passenger platform 9 to the empty parking space 5a.

On the other hand, the same is true for when the user makes the automated driving vehicle 15 exit the automated parking lot 3. For example, if the user reaches the passenger platform 9, the lot exit request is sent together with the vehicle ID for identifying the vehicle from the mobile terminal of the user through the communication network to the lot entry/exit management server 13. If the lot entry/exit management server 13 receives the lot exit request, the lot entry/exit management server 13 sets the running route of the vehicle enabling the automated driving vehicle 15 to reach the passenger platform 9 from the space 5a parked at without contacting other vehicles or pedestrians and sends this set running route to the automated driving vehicle 15 of the user. If the automated driving vehicle 15 of the user receives the set running route from the lot entry/exit management server 13, the automated driving vehicle 15 of the user is made to move along this set running route from the space 5a parked at by automated driving to the passenger platform 9.

Next, referring to FIG. 2, the work for lot entry and exit of the manual driving vehicle 16 at the automated parking lot 3 will be explained in a bit more detail. In the embodiment of the present invention, when a user utilizing the automated parking service makes his or her own manual driving vehicle 16 park at the automated parking lot 3, for example, when the manual driving vehicle 16 reaches the passenger platform 9, for example, the lot entry request is sent together with the vehicle ID for identifying the vehicle from the mobile terminal of the user through the communication network to the lot entry/exit management server 13. If the lot entry/exit management server 13 receives the lot entry request, the lot entry/exit management server 13 makes the vehicle conveyance robot 11 move by automated driving to the passenger platform 9, loads the manual driving vehicle 16 stopped at the passenger platform 9 onto the vehicle conveyance robot 11, then makes the vehicle conveyance robot 11 carrying the manual driving vehicle 16 move from the passenger platform 9 to the set parking space 5a as shown by the broken arrow in FIG. 2.

On the other hand, the same is true for when the user makes the manual driving vehicle 16 exit from the automated parking lot 3. For example, if the user reaches the passenger platform 9, he or she sends the lot exit request together with the vehicle ID for identifying the vehicle from the mobile terminal of the user through the communication network to the lot entry/exit management server 13. If the lot entry/exit management server 13 receives the lot exit request, the lot entry/exit management server 13 makes the vehicle conveyance robot 11 move by automated driving to the parking space 5a, loads the manual driving vehicle 16 parked at the parking space 5a onto the vehicle conveyance robot 11, then makes the vehicle conveyance robot 11 carrying the manual driving vehicle 16 move to the passenger platform 9 as shown by the solid arrow in FIG. 2.

In this way, in the embodiment of the present invention, the vehicle conveyance robots 11 are managed by the lot entry/exit management server 13. Therefore, first, management of the vehicle conveyance robots 11 by the lot entry/exit management server 13 will be explained. At the lot entry/exit management server 13, the current states $X_i$ ($i=1$, $2 \ldots 5$), $Y_i$ ($i=1, 2 \ldots 5$), $R_0$ of all of the No. 1 to No. S vehicle conveyance robots 11 present in the automated parking lot 3 such as shown in FIG. 10 are constantly acquired based on the image signals captured by the infrastructure sensors 14 or the position information of the vehicle conveyance robots 11 received from the vehicle conveyance robots 11. In the list of FIG. 11, the contents of the states $X_i$, $Y_i$, $R_0$ are shown divided between the states at the time of lot entry and the states at the time of lot exit.

That is, as shown in FIG. 11, at the time of lot entry of the manual driving vehicle 16, $R_0$ shows the state of standing by at the standby location 10, $X_1$ shows the state of running toward the vehicle loading ready position of the passenger platform 9 (FIG. 7A), $X_2$ shows the state of stopping for processing for loading the vehicle at the passenger platform 9, $X_3$ shows the state of running toward the position for unloading the vehicle at the parking space 5, $X_4$ shows the state of stopping for processing for unloading the vehicle at the parking space 5, and $X_5$ shows the state of running for returning to the standby location 10. Further, at the time of lot exit of the manual driving vehicle 16, $R_0$ shows the state of standing by at the standby location $Y_1$ shows the state of running toward the vehicle loading ready position of the parking space 5 (FIG. 7A), $Y_2$ shows the state of stopping for processing for loading the vehicle at the parking space 5, $Y_3$ shows the state of running toward the position for unloading the vehicle of the passenger platform 9, $Y_4$ shows the state of stopping for processing for unloading the vehicle at the passenger platform 9, and $Y_5$ shows the state of running for returning to the standby location 10.

Figure 12:
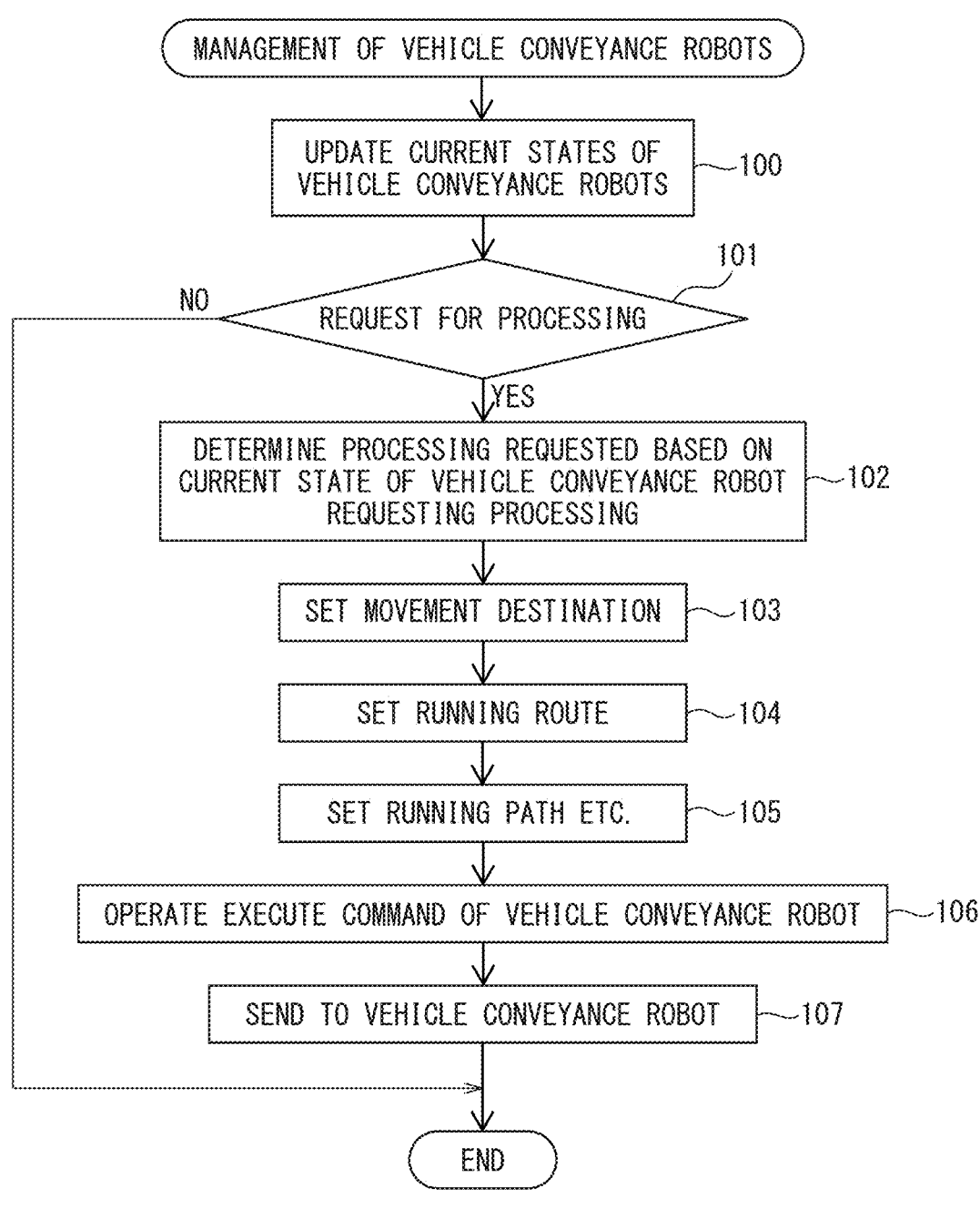
FIG. 12 is a flow chart for managing a vehicle conveyance robot.

Now then, in the embodiment of the present invention, as explained later, a request for processing which the vehicle conveyance robot 11 should next perform is sent from the vehicle conveyance robot 11 to the lot entry/exit management server 13. If receiving the request for processing to next perform, the lot entry/exit management server 13 determines the processing to next perform based on the current state of the vehicle conveyance robot 11. The request for processing determined is sent to the vehicle conveyance robot 11 and an operation command is issued to the vehicle conveyance robot 11. In this way, in the embodiment of the present invention, the behavior of the vehicle conveyance robot 11 is managed by the lot entry/exit management server 13. The management routine for managing the vehicle conveyance robot 11 is shown in FIG. 12. This routine is repeatedly performed at the electronic control unit 20 of the lot entry/exit management server 13.

Referring to FIG. 12, first, at step 100, the current states of all of the vehicle conveyance robots 11 shown in FIG. 10 are updated based on the image signals captured by the infrastructure sensors 14 or the position information of the vehicle conveyance robots 11 received from the vehicle conveyance robots 11. Next, at step 101, it is judged if the request for processing which the vehicle conveyance robot 11 should next perform has been received from the vehicle conveyance robot 11. When it is judged that the request for processing which the vehicle conveyance robot 11 should next perform has not been received, the processing cycle is ended. As opposed to this, when it is judged that the request for processing which the vehicle conveyance robot 11 should next perform has been received, the routine proceeds to step 102.

At step 102, the request for processing with respect to the vehicle conveyance robot 11 is determined based on the current state of the vehicle conveyance robot 11 issuing the request for processing to next perform. For example, if explaining as an example the case where the request for processing to next perform is issued from the vehicle conveyance robot 11 when the manual driving vehicle 16 finishes being loaded at the passenger platform 9, at this time, the current state of the vehicle conveyance robot 11 is a state of stopping for processing for loading a vehicle at the passenger platform 9 shown by $X_2$ at FIG. 11. Therefore, at step 102, processing for making the vehicle conveyance robot 11 move to the empty parking space 5 and unloading the manual driving vehicle 16 from the vehicle conveyance robot 11 is determined as the request for next processing.

If the request for next processing with respect to the vehicle conveyance robot 11 is determined at step 102, at step 103, the movement destination of the vehicle conveyance robot 11 is set. In the above-mentioned example, the empty parking space 5 is set as the movement destination of the vehicle conveyance robot 11 from among the large number of parking spaces 5. If the movement destination is set, the routine proceeds to step 104 where the running route from the passenger platform 9 to the empty parking space 5 is set based on the map data of the parking lot region 4 stored in the memory 32. Next, at step 105, the running path and running speed of the vehicle conveyance robot 11 not contacting other vehicles or structures are determined. Next, at step 106, the operation execute command of the vehicle conveyance robot 11 is issued. Next, at step 107, the request for processing with respect to the vehicle conveyance robot 11 and the empty parking space 5, the running route, the running path, and the running speed which are set and the operation execute command are sent from the lot entry/exit management server 13 to the vehicle conveyance robot 11.

Figure 13:
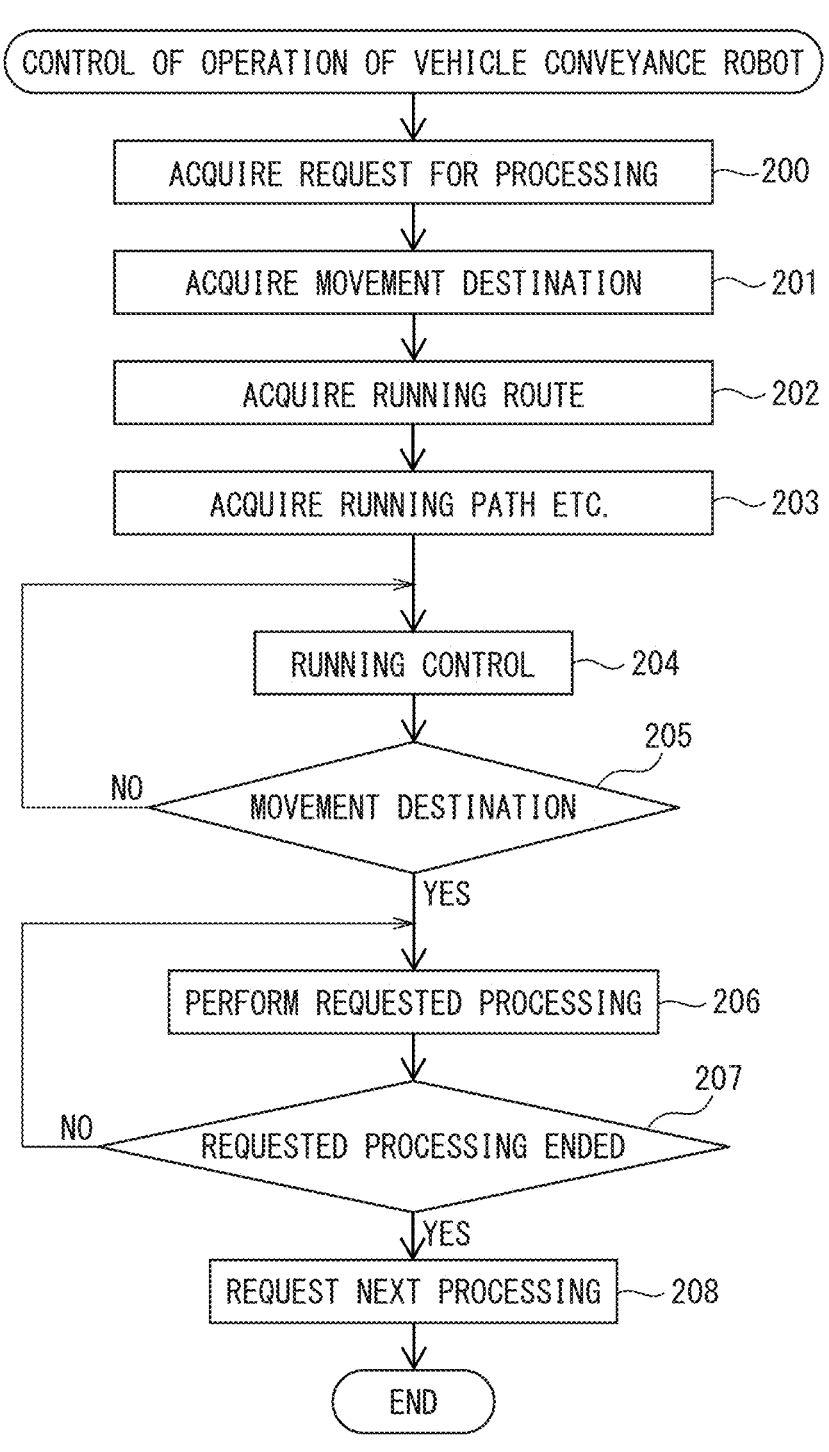
FIG. 13 is a flow chart for control of operation of a vehicle conveyance robot.

If the operation execute command is sent from the lot entry/exit management server 13 to the vehicle conveyance robot 11, control of automated driving of the vehicle conveyance robot 11 is started. FIG. 13 shows this routine for control of operation of the vehicle conveyance robot 11. This routine is repeatedly performed at the electronic control unit 60 mounted at the conveyance robot head 50 of the vehicle conveyance robot 11.

Referring to FIG. 13, first, at step 200, the request for processing with respect to the vehicle conveyance robot 11 determined at the lot entry/exit management server 13 is acquired. Next, at step 201, the movement destination set at the lot entry/exit management server 13 is acquired. Next, at step 202, the running route set at the lot entry/exit management server 13 is acquired. At step 203, the running path and the running speed set at the lot entry/exit management server 13 are acquired. Next, at step 204, control of running of the vehicle conveyance robot 11 is performed along the set running path without contacting other vehicles or pedestrians based on the results of detection of cameras capturing the front of the vehicle conveyance robot 11 etc., LIDAR, radar, or other periphery detection sensors. Next, at step 205, it is judged if the vehicle conveyance robot 11 reaches the movement destination, in the above-mentioned example, if the vehicle conveyance robot 11 reaches the set empty parking space 5. When it is judged that the automated driving vehicle 6 has not reached the movement destination, the routine returns to step 204 where the automated driving of the vehicle conveyance robot 11 is continued. On the other hand, if at step 205 it is judged that the vehicle conveyance robot 11 reaches the movement destination, the routine proceeds to step 206.

At step 206, the request for processing with respect to the vehicle conveyance robot 11 is performed. In the above-mentioned example, processing for unloading the manual driving vehicle 16 from the vehicle conveyance robot 11 is performed. That is, the bed part 51 is made to descend, and the carried manual driving vehicle 16 is lowered to the ground surface of the parking space 5. Next, all of the arms 55 are made to swing to the retracted positions. Next, the vehicle conveyance robot 11 is made to advance and, as shown in FIG. 8B, the bed part 51 is made to move to the running ready position where it is completely pulled out from under the manual driving vehicle 16. At step 207, it is judged if the request for processing with respect to the vehicle conveyance robot 11, in the above-mentioned example, the processing for unloading the manual driving vehicle 16 from the vehicle conveyance robot 11, has been completed, that is, if the bed part 51 has been made to move to the running ready position. When it is judged that the request for processing with respect to the vehicle conveyance robot 11 has not been completed, the routine returns to step 206 where the request for processing with respect to the vehicle conveyance robot 11 is continued. On the other hand, when at step 207 it is judged that the request for processing with respect to the vehicle conveyance robot 11 has been completed, the routine proceeds to step 208 where the request for processing which the vehicle conveyance robot 11 should next perform is sent to the lot exit management server 13.

In this way, the vehicle conveyance robot 11 is controlled using the routine for management of a vehicle conveyance robot 11 shown in FIG. 12 and the routine for control of operation of a vehicle conveyance robot 11 shown in FIG. 13. Therefore, even where there is the request for lot entry/exit from the manual driving vehicle 16, the vehicle conveyance robot 11 is controlled using the routine for management of the vehicle conveyance robot 11 shown in FIG. 12 and the routine for control of operation of the vehicle conveyance robot 11 shown in FIG. 13. Therefore, next, referring to FIG. 14, the routine for control of lot entry/exit management performed at the electronic control unit 20 when the lot entry/exit management server 13 receives the request for lot entry/exit from the automated driving vehicle 15 or manual driving vehicle 16 will be explained.

Figure 14:
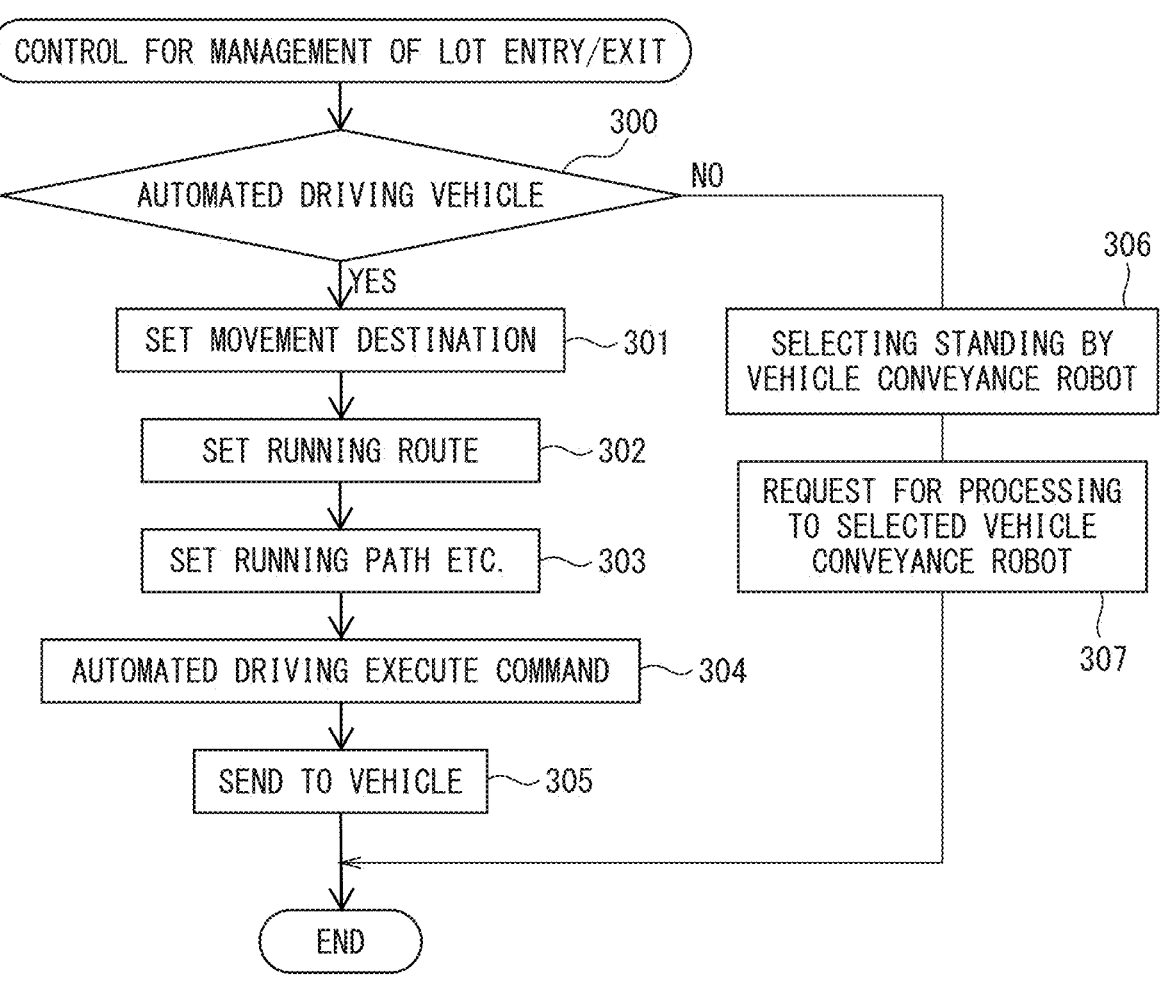
FIG. 14 is a flow chart for lot entry/exit management control.

Referring to FIG. 14, first, at step 300, it is judged if the vehicle requesting lot entry is the automated driving vehicle 15 or is the manual driving vehicle 16. When it is judged that the vehicle requesting lot entry is the automated driving vehicle 15, the routine proceeds to step 301 where the empty parking space 5 is set as the movement destination of the automated driving vehicle 15 among the large number of parking spaces 5. If the movement destination is set, the routine proceeds to step 302 where the running route from the passenger platform 9 to the empty parking space 5 is set based on the map data of the parking lot region 4 stored in the memory 32. Next, at step 303, the running path and the running speed of the automated driving vehicle 15 not contacting other vehicles or structures are determined. Next, at step 304, the automated operation execute command of the automated driving vehicle 15 is issued. Next, at step 305, the empty parking space 5, the running route, the running path, and the running speed which are set and the automated operation execute command are sent from the lot entry/exit management server 13 to the automated driving vehicle 15.

Figure 15:
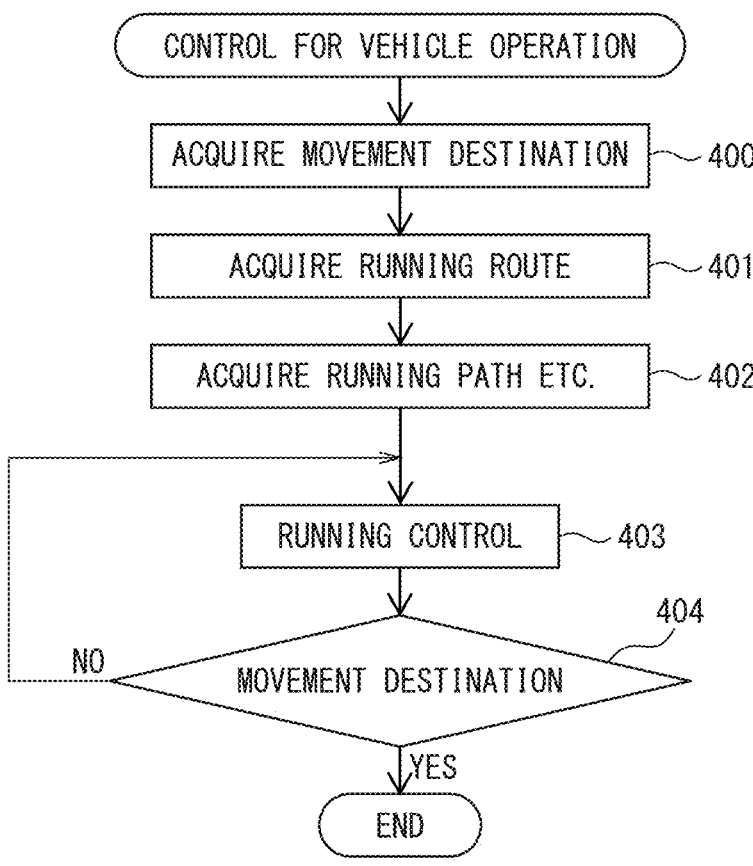
FIG. 15 is a flow chart for control of operation of a vehicle.

If the automated operation execute command is sent from the lot entry/exit management server 13 to the automated driving vehicle 15, control of automated driving of the automated driving vehicle 15 is started. FIG. 15 shows the vehicle operation control routine for control of operation of this automated driving vehicle 15. This routine is repeatedly performed at the electronic control unit 30 mounted in the automated driving vehicle 15.

Referring to FIG. 15, first, at step 400, the movement destination set at the lot entry/exit management server 13 is acquired. Next, at step 401, the running route set at the lot entry/exit management server 13 is acquired. At step 402, the running path and the running speed set at the lot entry/exit management server 13 are acquired. Next, at step 403, control for running of the automated driving vehicle 15 is performed along the set running path based on the results of detection of the cameras capturing the front of the vehicle conveyance robot 11 etc., the LIDAR, radar, or other periphery detection sensors so as not to contact other vehicles or pedestrians. Next, at step 404, it is judged if the automated driving vehicle 15 reaches the movement destination. When it is judged that the automated driving vehicle 15 has not reached the movement destination, the routine returns to step 403 where automated driving of the automated driving vehicle 15 is continued. On the other hand, when at step 404 it is judged that the automated driving vehicle 15 reaches the movement destination, that is, when parking to the empty parking space 5 has been completed, lot entry management is ended.

On the other hand, control for lot entry/exit management when the user desires lot exit of the automated driving vehicle 15 is also performed using the routine for lot entry/exit management shown in FIG. 14. However, in this case, at step 301 of FIG. 14, the passenger platform 9 is set as the movement destination of the automated driving vehicle 15, at step 302, the running route from the parking space 5 currently parked at to the passenger platform 9 is set, at step 303, the running path and the running speed of the automated driving vehicle 15 not contacting other vehicles or structures are set, at step 304, the automated operation execute command of the automated driving vehicle 15 is issued, and at step 305, the movement destination, the running route, the running path, and the running speed which are set and the automated operation execute command are sent from the lot entry/exit management server 13 to the automated driving vehicle 15. If the automated driving vehicle 15 receives the movement destination, the running route, the running path, and the running speed which are set and the automated operation execute command, processing for lot exit of the automated driving vehicle 15 is performed by the routine for control of operation of the automated driving vehicle 15 shown in FIG. 15.

On the other hand, when at step 300 of FIG. 14 it is judged that the vehicle requesting the lot entry/exit is the manual driving vehicle 16, the routine proceeds to step 306 where one vehicle conveyance robot 11 is selected from among the vehicle conveyance robots 11 standing by at the standby location 10. Next, at step 307, the request for processing with respect to the selected vehicle conveyance robot 11 is made. That is, when the manual driving vehicle 16 requests lot entry, the request for lot entry of the manual driving vehicle 16 is made. When the manual driving vehicle 16 requests lot exit, the request for lot exit of the manual driving vehicle 16 is made. In this case, when the manual driving vehicle 16 is requesting lot entry, at the routine for management of the vehicle conveyance robot 11 shown in FIG. 12, processing is performed for making the vehicle conveyance robot 11 move to the passenger platform 9 and loading the manual driving vehicle 16 on the vehicle conveyance robot 11, while when the manual driving vehicle 16 is requesting lot exit, processing is performed for making the vehicle conveyance robot 11 move to the manual driving vehicle 16 parked at the parking space 5 and load the manual driving vehicle 16 on the vehicle conveyance robot 11, then making the vehicle conveyance robot 11 move to the passenger platform 9 and unload the manual driving vehicle 16 from the vehicle conveyance robot 11.

In this regard, when the automated driving vehicle 15 breaks down and stops inside the automated parking lot 3, the stopped broken down vehicle has to be made to move to a location not interfering with running of other vehicles as fast as possible. In this case, in the embodiment of the present invention, the vehicle conveyance robot 11 can be used to convey the broken down vehicle. In this case, when there is the request for conveyance of the broken down vehicle by the vehicle conveyance robot 11, if the vehicle conveyance robot 11 in the middle of conveying the vehicle is running near the broken down vehicle for which conveyance is requested, rather than making the empty vehicle conveyance robot 11 move from the standby location 10, utilizing the vehicle conveyance robot 11 in the middle of conveying the vehicle to convey the broken down vehicle for which conveyance is requested enables the broken down vehicle for which conveyance is requested to be conveyed by the vehicle conveyance robot 11 in a short time from the request for conveyance and can therefore be said to be preferable.

Therefore, in the embodiment of the present invention, when there is the request for conveyance of another vehicle during conveyance of one vehicle by the vehicle conveyance robot 11, the one vehicle being conveyed is unloaded from the vehicle conveyance robot 11, the other vehicle is loaded on the vehicle conveyance robot 11, and the other vehicle is recovered by the vehicle conveyance robot 11. In FIG. 3, one typical example of such work for recovery of another vehicle, that is, the broken down vehicle, by the vehicle conveyance robot 11, is schematically illustrated.

In FIG. 3, 15a shows the automated driving vehicle which has broken down and stopped inside the parking lot region 4. Below, this automated driving vehicle 15a which has broken down and stopped will be referred as a "broken down vehicle 15a". On the other hand, in FIG. 3, the vehicle conveyance robot 11 carrying the manual driving vehicle 16 and running toward the broken down vehicle 15a is shown by K1. In this case, in the embodiment of the present invention, the command for recovery of the broken down vehicle 15a is issued to the vehicle conveyance robot 11 running carrying the manual driving vehicle 16. If the command for recovery of the broken down vehicle 15a is issued to the vehicle conveyance robot 11, the vehicle conveyance robot 11 is made to move by automated driving from the location shown by K1 to the location shown by K2 not interfering with running of other vehicles and is stopped once at the location K2. That is, if the command for recovery of the broken down vehicle 15a is issued to the vehicle conveyance robot 11, the vehicle conveyance robot 11 is made to move by automated driving to the temporary parking space not interfering with running of other vehicles shown by K2 and is parked temporarily at the temporary parking space K2.

Next, at the temporary parking space K2, the carried manual driving vehicle 16 is unloaded from the vehicle conveyance robot 11. Next, the empty vehicle conveyance robot 11 is made to move to the vehicle loading ready position of the broken down vehicle 15a shown by K4 (FIG. 7A) as shown by the arrow T. Next, the work for loading the broken down vehicle 15a on the vehicle conveyance robot 11 is performed. In this way, the work for recovering the broken down vehicle 15a is performed. After that, the vehicle conveyance robot 11 carrying the broken down vehicle 15a is, for example, made to move to the empty parking space 5. The manual driving vehicle 16 unloaded at the temporary parking space K2 is made to move to the empty parking space 5 by the vehicle conveyance robot 11 which had carried this manual driving vehicle 16 or another vehicle conveyance robot 11.

To perform such work of recovery of the broken down vehicle 15a, as shown in the list of FIG. 11, the current states Zi of the vehicle conveyance robots 11 are set in advance for the time of occurrence of the broken down vehicle. As shown in FIG. 11, at the time of occurrence of the broken down vehicle, $Z_1$ shows a state of temporarily stopping for heading to recover the broken down vehicle 15a, $Z_2$ shows a state of running toward the vehicle unloading position of the temporary parking space K2, $Z_3$ shows a state of stopping for processing for unloading the vehicle at the temporary parking space K2, $Z_4$ shows a state of running toward the loading ready position of the broken down vehicle 15a, $Z_5$ shows a state of stopping for processing for loading the broken down vehicle 15a, $Z_6$ shows a state of running toward the vehicle loading position of the parking space of the broken down vehicle 15a, and $Z_7$ shows a state of stopping for processing for unloading the vehicle at the parking space of the broken down vehicle 15a.

Figure 16:
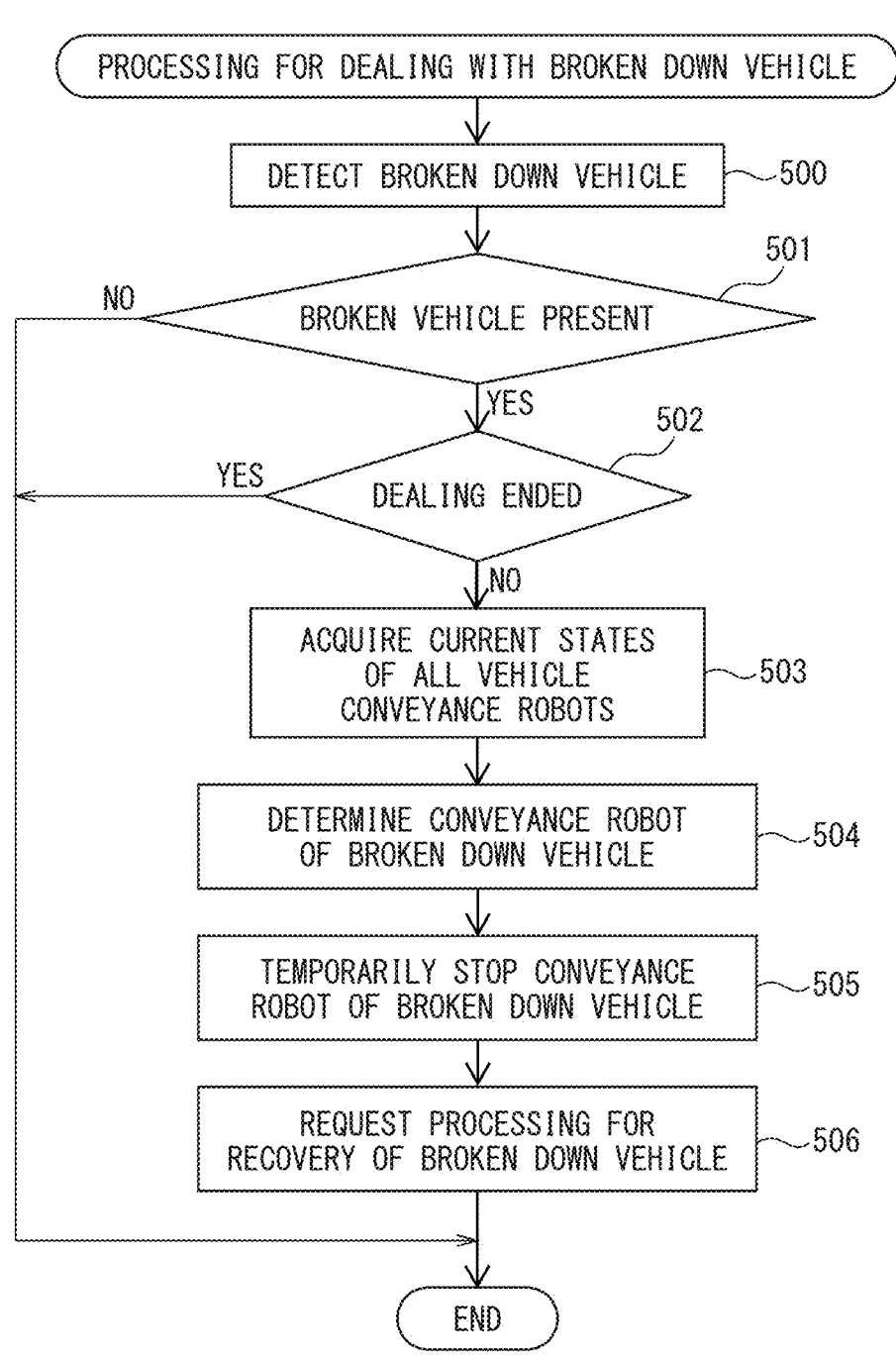
FIG. 16 is a flow chart for performing processing for dealing with a broken down vehicle.

FIG. 16 shows the routine of the processing for dealing with the broken down vehicle for performing the work of recovery of the broken down vehicle. This routine is repeatedly performed at the electronic control unit 20 of the lot entry/exit management server 13.

Referring to FIG. 16, first, at step 500, it is detected if there is any broken down vehicle 15a present in the automated parking lot 3. The broken down vehicle 15a is detected based on breakdown information of the automated driving vehicle 15 transmitted from the automated driving vehicle 15 to the lot entry/exit management server 13 or image signals captured by the infrastructure sensors 14. Next, at step 501, it is judged if there is the broken down vehicle 15a present in the automated parking lot 3 based on the results of detection of any broken down vehicle 15a. When it is judged that there is no broken down vehicle 15a present in the automated parking lot 3, the processing cycle is ended. As opposed to this, when it is judged that there is the broken down vehicle 15a present in the automated parking lot 3, the routine proceeds to step 502 where it is judged if the broken down vehicle 15a has finished being dealt with. When it is judged that the broken down vehicle 15a has finished being dealt with, the processing cycle is ended. As opposed to this, when it is judged that the broken down vehicle 15a has not finished being dealt with, the routine proceeds to step 503 where the broken down vehicle 15a is dealt with.

That is, at step 503, the current states of all of the vehicle conveyance robots 11 shown in FIG. 10 are acquired. Next, at step 504, the vehicle conveyance robot 11 used for conveying the broken down vehicle 15a is determined from among the vehicle conveyance robots 11 carrying manual driving vehicles 16. In this case, for example, the vehicle conveyance robot 11 running closest to the broken down vehicle 15a is determined as the vehicle conveyance robot 11 used for conveying the broken down vehicle 15a or the vehicle conveyance robot 11 running after the broken down vehicle 15a is determined as the vehicle conveyance robot 11 used for conveying the broken down vehicle 15a. If the vehicle conveyance robot 11 used for conveying the broken down vehicle 15a is determined, the routine proceeds to step 505 where the vehicle conveyance robot 11 used for conveying the broken down vehicle 15a is temporarily stopped. Next, at step 506, the request for processing for recovery of the broken down vehicle 15a by this vehicle conveyance robot 11 is issued.

If the request for processing for recovery of the broken down vehicle 15a is issued, by the routine for management of the vehicle conveyance robot shown in FIG. 12, various commands necessary for recovering the broken down vehicle 15a are issued to the vehicle conveyance robot 11 determined for use for conveying the broken down vehicle 15a, and the operation of the vehicle conveyance robot 11 is controlled by the routine for control of operation of the vehicle conveyance robot 11 shown in FIG. 13.

That is, if the request for processing for recovering the broken down vehicle 15a is issued, it is judged at step 101 of the routine for management of vehicle conveyance robots shown in FIG. 12 that there has been the request for processing for recovering the broken down vehicle 15a and the routine proceeds to step 102. At step 102, the request for processing with respect to the vehicle conveyance robot 11 is determined based on the current state of the vehicle conveyance robot 11 decided on for use for conveying the broken down vehicle 15a. When there has been the request for processing for recovering the broken down vehicle 15a, the current state of the vehicle conveyance robot 11 is the state of temporary stopping for heading toward recovery of the broken down vehicle 15a shown by $Z_1$ in FIG. 11. Therefore, at step 102, processing for making the vehicle conveyance robot 11 move to the temporary parking space K2 not interfering with running of other vehicles (FIG. 3) and unloading the manual driving vehicle 16 from the vehicle conveyance robot 11 is determined as the request for next processing.

If at step 102 the request for next processing with respect to the vehicle conveyance robot 11 is determined, at step 103, the movement destination of the vehicle conveyance robot 11 is set. At this time, the temporary parking space K2 not interfering with the running of other vehicles is searched for, for example, based on the image signals captured by the infrastructure sensors 14. The temporary parking space K2 not interfering with running of other vehicles obtained as a result of the search is set as the movement destination of the vehicle conveyance robot 11. If the movement destination is set, the routine proceeds to step 104 where the running route from the passenger platform 9 to the temporary parking space K2 is set based on the map data of the parking lot region 4 stored in the memory 32. Next, at step 105, the running path and the running speed of the vehicle conveyance robot 11 not contacting other vehicles or structures are determined. Next, at step 106, the operation execute command of the vehicle conveyance robot 11 is issued. Next, at step 107, the request for processing with respect to the vehicle conveyance robot 11, the temporary parking space K2, the running route, the running path, the running speed, and the operation execute command are sent from the lot entry/exit management server 13 to the vehicle conveyance robot 11.

If the operation execute command is sent from the lot entry/exit management server 13 to the vehicle conveyance robot 11, the routine for control of operation of the vehicle conveyance robot 11 shown in FIG. 13 is performed and the work for recovery of the broken down vehicle 15a by the vehicle conveyance robot 11 is started. That is, referring to FIG. 13, first, at step 200, the request for processing with respect to the vehicle conveyance robot 11 determined at the lot entry/exit management server 13, that is, the request for recovery of the broken down vehicle 15*a*, is acquired. Next, at step 201, the movement destination set at the lot entry/exit management server 13, that is, the temporary parking space K2, is acquired. Next, at step 202, the running route set at the lot entry/exit management server 13 is acquired, while at step 203, the running path and the running speed set at the lot entry/exit management server 13 are acquired.

Next, at step 204, control for running of the vehicle conveyance robot 11 is performed along the set running path based on the results of detection of the cameras capturing the front of the vehicle conveyance robot 11 etc., the LIDAR, radar, or other periphery detection sensors so as not to contact other vehicles or pedestrians. Next, at step 205, it is judged if the vehicle conveyance robot 11 reaches the movement destination, that is, the temporary parking space K2. When it is judged that the automated driving vehicle 6 has not reached the movement destination, that is, the temporary parking space K2, the routine returns to step 204 where automated driving of the vehicle conveyance robot 11 is continued. On the other hand, when at step 205 it is judged that the vehicle conveyance robot 11 reaches the movement destination, that is, the temporary parking space K2, the routine proceeds to step 206.

At step 206, the request for processing with respect to the vehicle conveyance robot 11, that is, processing for unloading the manual driving vehicle 16 from the vehicle conveyance robot 11, is performed. That is, the bed part 51 is made to descend and the carried manual driving vehicle 16 is lowered to the ground surface of the temporary parking space K2. Next, all of the arms 55 are made to swing to the retracted positions. Next, the vehicle conveyance robot 11 is made to advance and the bed part 51 is made to move to the running ready position where it is completely pulled out from under the manual driving vehicle 16 as shown by K3 in FIG. 3. At step 207, it is judged if the request for processing with respect to the vehicle conveyance robot 11, that is, the processing for unloading the manual driving vehicle 16 from the vehicle conveyance robot 11, has been completed. When it is judged that the request for processing with respect to the vehicle conveyance robot 11 has not been completed, the routine returns to step 206 where the request for processing with respect to the vehicle conveyance robot 11 is continued. On the other hand, when at step 207 it is judged that the request for processing with respect to the vehicle conveyance robot 11 has been completed, the routine proceeds to step 208 where the request for processing which the vehicle conveyance robot 11 should next perform is sent to the lot entry/exit management server 13.

If the lot entry/exit management server 13 receives the request for processing which the vehicle conveyance robot 11 should next perform, at step 101 of the routine for management of the vehicle conveyance robot shown in FIG. 12, it is judged that there is the request for processing and the routine proceeds to step 102. At step 102, the request for processing with respect to the vehicle conveyance robot 11 is determined based on the current state of the vehicle conveyance robot 11 issuing the request for processing to be next performed. At this time, the current state of the vehicle conveyance robot 11 is the stopped state for processing for unloading the vehicle at the temporary parking space K2 shown by Z₃ at FIG. 11. Therefore, at step 102, processing for making the vehicle conveyance robot 11 move toward the loading ready position K4 (FIG. 3) of the broken down vehicle 15*a* and load the broken down vehicle 15*a* on the vehicle conveyance robot 11 is determined as the request for next processing.

If at step 102 the request for next processing with respect to the vehicle conveyance robot 11 is determined, at step 103, the movement destination of the vehicle conveyance robot 11 is set. At this time, for example, the loading ready position K4 (FIG. 3) of the broken down vehicle 15*a* is set as the movement destination of the vehicle conveyance robot 11 based on the image signals captured by the infrastructure sensors 14. If the movement destination is set, the routine proceeds to step 104 where the running route from the running ready position K3 (FIG. 3) to the loading ready position K4 (FIG. 3) of the broken down vehicle 15*a* is set based on the map data of the parking lot region 4 stored in the memory 32. Next, at step 105, the running path and running speed of the vehicle conveyance robot 11 not contacting other vehicles or structures are determined. Next, at step 106, the operation execute command of the vehicle conveyance robot 11 is issued. Next, at step 107, the request for processing with respect to the vehicle conveyance robot 11, the loading ready position K4 (FIG. 3) of the broken down vehicle 15*a*, the running route, the running path, the running speed, and the operation execute command are sent from the lot entry/exit management server 13 to the vehicle conveyance robot 11.

If the operation execute command is sent from the lot entry/exit management server 13 to the vehicle conveyance robot 11, the operation control routine of the vehicle conveyance robot 11 shown in FIG. 13 is performed and processing is started for making the vehicle conveyance robot 11 move toward the loading ready position K4 (FIG. 3) of the broken down vehicle 15*a* and loading the broken down vehicle 15*a* on it. That is, if referring to FIG. 13, first, at step 200, the request for processing for the vehicle conveyance robot 11 determined at the lot entry/exit management server 13, that is, the request for processing for making the vehicle conveyance robot 11 move toward the loading ready position K4 (FIG. 3) of the broken down vehicle 15*a* and loading the broken down vehicle 15*a* on the vehicle conveyance robot 11, is acquired. Next, at step 201, the movement destination set at the lot entry/exit management server 13, that is, the loading ready position K4 (FIG. 3) of the broken down vehicle 15*a*, is acquired, then at step 202, the running route set at the lot entry/exit management server 13 is acquired and, at step 203, the running path and running speed set at the lot entry/exit management server 13 are acquired.

Next, at step 204, control for running of the vehicle conveyance robot 11 is performed along the set running path based on the results of detection of the cameras capturing the front of the vehicle conveyance robot 11 etc., the LIDAR, radar, or other periphery detection sensors so as not to contact other vehicles or pedestrians. Next, at step 205, it is judged if the vehicle conveyance robot 11 reaches the movement destination, that is, the loading ready position K4 (FIG. 3) of the broken down vehicle 15*a*. When it is judged that the automated driving vehicle 6 has not reached the movement destination, that is, the loading ready position K4 (FIG. 3) of the broken down vehicle 15*a*, the routine returns to step 204 where automated driving of the vehicle conveyance robot 11 is continued. On the other hand, when at step 205 it is judged that the vehicle conveyance robot 11 reaches the movement destination, that is, the loading ready position K4 (FIG. 3) of the broken down vehicle 15*a*, the routine proceeds to step 206.

At step 206, the request for processing with respect to the vehicle conveyance robot 11, that is, the processing for loading the broken down vehicle 15a on the vehicle conveyance robot 11, is performed. That is, the vehicle conveyance robot 11 is made to retract and the bed part 51 is made to enter below the broken down vehicle 15a. Next, all of the arms 55 are made to swing to the projected positions, next, the bed part 51 is made to rise. If the bed part 51 is made to rise, all of the wheels of the broken down vehicle 15a are supported by the corresponding pairs of arms 55. Due to this, the broken down vehicle 15a is loaded on the vehicle conveyance robot 11. At step 207, it is judged if the request for processing with respect to the vehicle conveyance robot 11, that is, the processing for loading the broken down vehicle 15a on the vehicle conveyance robot 11, has been completed. When it is judged that the request for processing with respect to the vehicle conveyance robot 11 has not been completed, the routine returns to step 206 where the request for processing with respect to the vehicle conveyance robot 11 is continued. On the other hand, when at step 207 it is judged that the request for processing with respect to the vehicle conveyance robot 11 has been completed, the routine proceeds to step 208 where the request for processing which the vehicle conveyance robot 11 should next perform is sent to the lot entry/exit management server 13.

If the lot entry/exit management server 13 receives the request for processing which the vehicle conveyance robot 11 should next perform, at step 101 of the routine for management of the vehicle conveyance robot shown in FIG. 12, it is judged that there has been the request for processing which the vehicle conveyance robot 11 should next perform and the routine proceeds to step 102. At step 102, the request for processing with respect to the vehicle conveyance robot 11 is determined based the current state of the vehicle conveyance robot 11 issuing the request for processing to next perform. At this time, the current state of the vehicle conveyance robot 11 is the stopped state for processing for loading the broken down vehicle 15a shown by $Z_4$ at FIG. 11. Therefore, at step 102, processing for making the vehicle conveyance robot 11 carrying the broken down vehicle 15a move to for example the parking space for broken down vehicle use and unload the broken down vehicle 15a from the vehicle conveyance robot 11 is determined as the request for next processing.

If at step 102 the request for next processing with respect to the vehicle conveyance robot 11 is determined, at step 103, the movement destination of the vehicle conveyance robot 11 is set. At this time, for example, the parking space for broken down vehicle use is set as the movement destination of the vehicle conveyance robot 11, for example, based on the image signals captured by the infrastructure sensors 14. If the movement destination is set, the routine proceeds to step 104 where the running route from the current position to, for example, the parking space for broken down vehicle use, is set based on the map data of the parking lot region 4 stored in the memory 32. Next, at step 105, the running path and running speed of the vehicle conveyance robot 11 not contacting other vehicles or structures are determined. Next, at step 106, the operation execute command of the vehicle conveyance robot 11 is issued. Next, at step 107, the request for processing with respect to the vehicle conveyance robot 11, for example, the parking space for broken down vehicle use, the running route, the running path, the running speed, and the operation execute command are sent from the lot entry/exit management server 13 to the vehicle conveyance robot 11.

If the operation execute command is sent from the lot entry/exit management server 13 to the vehicle conveyance robot 11, the routine for control of the operation of the vehicle conveyance robot 11 shown in FIG. 13 is performed and processing is started for making the vehicle conveyance robot 11 carrying the broken down vehicle 15a move, for example, to the parking space for broken down vehicle use and unload the broken down vehicle 15a from the vehicle conveyance robot 11. That is, if referring to FIG. 13, first, at step 200, the request for processing with respect to the vehicle conveyance robot 11 determined at the lot entry/exit management server 13, that is, the request for processing for making the vehicle conveyance robot 11 carrying the broken down vehicle 15a move to, for example, the parking space for broken down vehicle use and unload the broken down vehicle 15a from the vehicle conveyance robot 11, is acquired. Next, at step 201, the movement destination set at the lot entry/exit management server 13, for example, the parking space for broken down vehicle use, is acquired. Next, at step 202, the running route set at the lot entry/exit management server 13 is acquired, while at step 203, the running path and the running speed set at the lot entry/exit management server 13 are acquired.

Next, at step 204, control for running of the vehicle conveyance robot 11 is performed along the set running path based on the results of detection of the cameras capturing the front of the vehicle conveyance robot 11 etc., the LIDAR, radar, or other periphery detection sensors so as not to contact other vehicles or pedestrians. Next, at step 205, it is judged if the vehicle conveyance robot 11 reaches the movement destination, for example, the parking space for broken down vehicle use. When it is judged that the vehicle conveyance robot 11 has not reached the movement destination, for example, the parking space for broken down vehicle use, the routine returns to step 204 where automated driving of the vehicle conveyance robot 11 is continued. On the other hand, when at step 205 it is judged that the vehicle conveyance robot 11 reaches the movement destination, for example, the parking space for broken down vehicle use, the routine proceeds to step 206.

At step 206, the request for processing for the vehicle conveyance robot 11, that is, for example, processing for unloading the broken down vehicle 15a from the vehicle conveyance robot 11 at the parking space for the broken down vehicle, is performed. That is, the bed part 51 is made to descend and the carried broken down vehicle 15a is, for example, lowered onto the ground surface of the parking space for broken down vehicle use. Next, all of the arms 55 are made to swing to the retracted positions. Next, the vehicle conveyance robot 11 is made to advance and the bed part 51 is made to move to the running ready position where it is completely pulled out from under the manual driving vehicle 16. At step 207, it is judged if the request for processing with respect to the vehicle conveyance robot 11, that is, the processing for unloading the broken down vehicle 15a from the vehicle conveyance robot 11, has been completed. When it is judged that the request for processing with respect to the vehicle conveyance robot 11 has not been completed, the routine returns to step 206 where the request for processing with respect to the vehicle conveyance robot 11 is continued. On the other hand, when at step 207 it is judged that the request for processing with respect to the vehicle conveyance robot 11 has been completed, the routine proceeds to step 208 where the request for processing which the vehicle conveyance robot 11 should next perform is sent from the lot entry/exit management server 13.

Next, the processing of the vehicle conveyance robot 11 to be performed next is performed. In this case, processing for making the vehicle conveyance robot 11 move to the temporary parking space K2 (FIG. 3) at which the manual driving vehicle 16 was dropped and reloading the manual driving vehicle 16 on the vehicle conveyance robot 11 or processing for returning the vehicle conveyance robot 11 to the standby location 10 is made the processing to be performed.

Note that, the work for recovery of the broken down vehicle 15*a* by the vehicle conveyance robot 11 explained up to here can also be applied to the case of conveying another vehicle by the vehicle conveyance robot 11 conveying a vehicle on a general road.

Therefore, in the embodiment of the present invention, the vehicle conveyance management system is comprised of the vehicle conveyance robot 11 which is automatically operated so as to convey a vehicle and the management server 13 for managing operation of the vehicle conveyance robot 11 wherein when there is a request for conveyance of another vehicle during conveyance of one vehicle by the vehicle conveyance robot 11, the one vehicle being conveyed is unloaded from the vehicle conveyance robot 11 and the other vehicle is loaded on the vehicle conveyance robot 11 and thereby the other vehicle is recovered by the vehicle conveyance robot 11. In this way, when there is the request for conveyance of another vehicle during conveyance of one vehicle by the vehicle conveyance robot 11, by unloading the one vehicle being conveyed from the vehicle conveyance robot 11 and by loading the other vehicle onto the vehicle conveyance robot 11, the vehicle for which conveyance is requested can be conveyed by the vehicle conveyance robot in a short time from the request for conveyance.

Furthermore, in the embodiment of the present invention, there is provided a vehicle conveyance management method comprising unloading one vehicle being conveyed from the vehicle conveyance robot 11 for conveying a vehicle and loading another vehicle onto the vehicle conveyance robot 11 and recovering the other vehicle by the vehicle conveyance robot 11 when there is a request for conveyance of the other vehicle during conveyance of the one vehicle by the vehicle conveyance robot 11. Further, there is provided a computer-readable storage medium storing a program that causes a computer to unload one vehicle being conveyed from the vehicle conveyance robot 11 for conveying a vehicle and load another vehicle onto the vehicle conveyance robot 11 and recover the other vehicle by the vehicle conveyance robot 11 when there is a request for conveyance of the other vehicle during conveyance of the one vehicle by the vehicle conveyance robot 11.

Further, in the embodiment of the present invention, entry to and exit from the automated parking lot 3 at which the manual driving vehicles 16 and the automated driving vehicles 15 can park is managed by the management server 13. At the time of entry into the automated parking lot 3, the automated driving vehicle 15 is made to move by automated driving to the set parking space 5 and the manual driving vehicle 16 is conveyed by the vehicle conveyance robot 11 to the set parking space 5. When the automated driving vehicle 15 breaks down and stops inside the automated parking lot 3, the manual driving vehicle 16 being conveyed is unloaded from the vehicle conveyance robot 11 and the broken down automated driving vehicle 15 is loaded on the vehicle conveyance robot 11. Due to this, the broken down automated driving vehicle 15 is recovered by the vehicle conveyance robot 11.

In this case, in the embodiment of the present invention, the presence of the automated driving vehicle 15 which has broken down and stopped is monitored for by the management server 13. When the presence of the automated driving vehicle 15 which has broken down and stopped is recognized by the management server 13, the manual driving vehicle 16 being conveyed for lot entry is unloaded from the vehicle conveyance robot 11, then the vehicle conveyance robot 11 is made to head to the broken down automated driving vehicle 15 and the broken down automated driving vehicle 15 is loaded on the vehicle conveyance robot 11. In this case, the manual driving vehicle 16 being conveyed is unloaded from the vehicle conveyance robot 11 at a location not interfering with traffic. Note that, in this case, a delay is caused in the processing for lot entry of the manual driving vehicle 16 unloaded from the vehicle conveyance robot 11, but even if a delay is caused in the processing for lot entry of the manual driving vehicle 16, no great problem arises.

On the other hand, in the embodiment of the present invention, when the presence of the automated driving vehicle 15 which has broken down and stopped is recognized by the management server 13, the vehicle conveyance robot 11 present at a position closest to the automated driving vehicle 15 which has broken down and stopped is searched for from among vehicle conveyance robots 11 conveying manual driving vehicles 16 for lot entry, the manual driving vehicle 16 being conveyed is unloaded from the searched vehicle conveyance robot 11, then the searched vehicle conveyance robot 11 is made to head toward the broken down automated driving vehicle 15 and the broken down automated driving vehicle 15 is loaded on the searched vehicle conveyance robot 11. Further, in the embodiment of the present invention, when the presence of the broken down automated driving vehicle 15 is recognized by the management server 13, the vehicle conveyance robot 11 moving after the broken down automated driving vehicle 15 is searched for from among vehicle conveyance robots 11 conveying manual driving vehicles 16 for lot entry, the manual driving vehicle 16 being conveyed is unloaded from the searched vehicle conveyance robot 11, then the searched vehicle conveyance robot 11 is made to head toward the broken down automated driving vehicle 15 and the broken down automated driving vehicle 15 is loaded on the searched vehicle conveyance robot 11.

Furthermore, in the embodiment of the present invention, when the presence of still another broken down automated driving vehicle 15 is recognized by the management server 13, the broken down automated driving vehicle 15 being conveyed is unloaded from the vehicle conveyance robot 11, the broken down other automated driving vehicle 15 is loaded on the vehicle conveyance robot 11, and the broken down other automated driving vehicle 15 is recovered by the vehicle conveyance robot 11.

What is claimed is:

1. A vehicle conveyance management system, comprising:

an automated driving vehicle conveyance robot configured to convey a vehicle, and a management server configured to manage operation of the automated driving vehicle conveyance robot, wherein the management server is configured to, in response to receiving a request for conveyance of another vehicle during conveyance of one vehicle by the automated driving vehicle conveyance robot, automatically control the automated driving vehicle conveyance robot to unload the one vehicle being conveyed from the automated driving vehicle conveyance robot, and load and recover the another vehicle onto the automated driving vehicle conveyance robot.

2. The vehicle conveyance management system according to claim 1, wherein the management server is configured to manage entry into and exit from an automated parking lot for parking manual driving vehicles and automated driving vehicles, at a time of entry into the automated parking lot, set a running route for an automated driving vehicle of the automated driving vehicles to move to a set parking space by automated driving, and automatically control the automated driving vehicle conveyance robot to convey a manual driving vehicle of the manual driving vehicles to the set parking space, and in response to the automated driving vehicle breaking down and stopping inside the automated parking lot, automatically control the automated driving vehicle conveyance robot to unload the manual driving vehicle being conveyed from the automated driving vehicle conveyance robot, and load and recover the automated driving vehicle which has broken down on the automated driving vehicle conveyance robot.

3. The vehicle conveyance management system according to claim 2, wherein the management server is configured to monitor a presence of the automated driving vehicle which has broken down and stopped, and in response to recognizing the presence of the automated driving vehicle which has broken down and stopped, automatically control the automated driving vehicle conveyance robot to unload the manual driving vehicle being conveyed for lot entry from the automated driving vehicle conveyance robot, automatically drive the automated driving vehicle conveyance robot to the automated driving vehicle which has broken down, and automatically control the automated driving vehicle conveyance robot to load the automated driving vehicle which has broken down on the automated driving vehicle conveyance robot.

4. The vehicle conveyance management system according to claim 3, wherein the management server is configured to, in response to recognizing the presence of the automated driving vehicle which has broken down and stopped, search, among a plurality of automated driving vehicle conveyance robots including the automated driving vehicle conveyance robot conveying the manual driving vehicles for lot entry, an automated driving vehicle conveyance robot present at a position closest to the automated driving vehicle which has broken down and stopped, automatically control the searched automated driving vehicle conveyance robot to unload the manual driving vehicle being conveyed by the searched automated driving vehicle conveyance robot from the searched automated driving vehicle conveyance robot, automatically drive the searched automated driving vehicle conveyance robot toward the automated driving vehicle which has broken down, and automatically control the searched automated driving vehicle conveyance robot to load the automated driving vehicle which has broken down on the searched automated driving vehicle conveyance robot.

5. The vehicle conveyance management system according to claim 4, wherein the automated driving vehicle conveyance robot includes:

a conveyance robot head having front drive wheels, a bed part connected to the conveyance robot head and configured to ascend or descend in a vertical direction, the bed part including a front bed part, and a rear bed part slidingly coupled with the front bed part, wherein the rear bed part has rear drive wheels, a lift link device arranged between the rear drive wheels and the rear bed part, and pairs of wheel support arms configured to swing 90 degrees from retracted positions at both sides of the front bed part and the rear bed part for supporting wheels of the vehicle.

6. The vehicle conveyance management system according to claim 3, wherein the management server is configured to, in response to recognizing the presence of the automated driving vehicle which has broken down, search, among a plurality of automated driving vehicle conveyance robots including the automated driving vehicle conveyance robot conveying the manual driving vehicles for lot entry, an automated driving vehicle conveyance robot moving behind the automated driving vehicle which has broken down, automatically control the searched automated driving vehicle conveyance robot to unload the manual driving vehicle being conveyed by the searched automated driving vehicle conveyance robot from the searched automated driving vehicle conveyance robot, automatically drive the searched automated driving vehicle conveyance robot toward the automated driving vehicle which has broken down, and automatically control the searched automated driving vehicle conveyance robot to load the automated driving vehicle which has broken down on the searched automated driving vehicle conveyance robot.

7. The vehicle conveyance management system according to claim 3, wherein the management server is configured to, in response to recognizing the presence of the automated driving vehicle which has broken down, control the automated driving vehicle conveyance robot to unload the manual driving vehicle being conveyed from the automated driving vehicle conveyance robot at a location not interfering with traffic.

8. The vehicle conveyance management system according to claim 3, wherein the management server is configured to, in response to recognizing a presence of another broken down automated driving vehicle, automatically control the automated driving vehicle conveyance robot to unload the automated driving vehicle which has broken down being conveyed from the automated driving vehicle conveyance robot, and automatically control the automated driving vehicle conveyance robot to load and recover the another broken down automated driving vehicle on the automated driving vehicle conveyance robot.

9. The vehicle conveyance management system according to claim 1, wherein the automated driving vehicle conveyance robot includes:
a conveyance robot head having front drive wheels,
a bed part connected to the conveyance robot head and configured to ascend or descend in a vertical direction, the bed part including
a front bed part, and
a rear bed part slidingly coupled with the front bed part, wherein the rear bed part has rear drive wheels,
a lift link device arranged between the rear drive wheels and the rear bed part, and
pairs of wheel support arms configured to swing 90 degrees from retracted positions at both sides of the front bed part and the rear bed part for supporting wheels of the vehicle.

10. A vehicle conveyance management method, comprising:
in response to a management server receiving a request for conveyance of another vehicle during conveyance of one vehicle by a vehicle conveyance robot for conveying a vehicle,
unloading, through the management server automatically controlling the vehicle conveyance robot, the one vehicle being conveyed from the vehicle conveyance robot, and
loading and recovering, through the management server automatically controlling the vehicle conveyance robot, the another vehicle onto the vehicle conveyance robot.

11. The vehicle conveyance management method according to claim 10, wherein the vehicle conveyance robot includes:
a conveyance robot head having front drive wheels,
a bed part connected to the conveyance robot head and configured to ascend or descend in a vertical direction, the bed part including
a front bed part, and
a rear bed part slidingly coupled with the front bed part, wherein the rear bed part has rear drive wheels,
a lift link device arranged between the rear drive wheels and the rear bed part, and
pairs of wheel support arms configured to swing 90 degrees from retracted positions at both sides of the front bed part and the rear bed part for supporting wheels of the vehicle.

12. The vehicle conveyance management method according to claim 10, wherein the vehicle conveyance management method further comprises:
managing entry into and exit from an automated parking lot for parking manual driving vehicles and automated driving vehicles;
at a time of entry into the automated parking lot,
setting a running route for an automated driving vehicle of the automated driving vehicles to move to a set parking space by automated driving, and
automatically controlling the vehicle conveyance robot to convey a manual driving vehicle of the manual driving vehicles to the set parking space, and
in response to the automated driving vehicle breaking down and stopping inside the automated parking lot, automatically controlling the vehicle conveyance robot to unload the manual driving vehicle being conveyed from the vehicle conveyance robot, and load and recover the automated driving vehicle which has broken down on the vehicle conveyance robot, the vehicle conveyance management method further comprises:
monitoring a presence of the automated driving vehicle which has broken down and stopped, and
in response to recognizing the presence of the automated driving vehicle which has broken down and stopped,
automatically controlling the vehicle conveyance robot to unload the manual driving vehicle being conveyed for lot entry from the vehicle conveyance robot,
automatically driving the vehicle conveyance robot to the automated driving vehicle which has broken down, and
automatically controlling the vehicle conveyance robot to load the automated driving vehicle which has broken down on the vehicle conveyance robot, and the vehicle conveyance management method further comprises:
in response to recognizing the presence of the automated driving vehicle which has broken down and stopped,
searching, among a plurality of vehicle conveyance robots including the vehicle conveyance robot conveying the manual driving vehicles for lot entry, a vehicle conveyance robot present at a position closest to the automated driving vehicle which has broken down and stopped,
automatically controlling the searched vehicle conveyance robot to unload the manual driving vehicle being conveyed by the searched vehicle conveyance robot from the searched vehicle conveyance robot,
automatically driving the searched vehicle conveyance robot toward the automated driving vehicle which has broken down, and
automatically controlling the searched vehicle conveyance robot to load the automated driving vehicle which has broken down on the searched vehicle conveyance robot, and the vehicle conveyance robot includes:
a conveyance robot head having front drive wheels,
a bed part connected to the conveyance robot head and configured to ascend or descend in a vertical direction, the bed part including
a front bed part, and
a rear bed part slidingly coupled with the front bed part, wherein the rear bed part has rear drive wheels,
a lift link device arranged between the rear drive wheels and the rear bed part, and
pairs of wheel support arms configured to swing 90 degrees from retracted positions at both sides of the front bed part and the rear bed part for supporting wheels of the vehicle.

13. A non-transitory computer-readable storage medium storing a program that causes a computer to:
in response to receiving a request for conveyance of another vehicle during conveyance of one vehicle by a vehicle conveyance robot for conveying a vehicle,
unload, by automatically controlling the vehicle conveyance robot, the one vehicle being conveyed from the vehicle conveyance robot, and
load and recover, by automatically controlling the vehicle conveyance robot, the another vehicle onto the vehicle conveyance robot.

14. The non-transitory computer-readable storage medium according to claim 13, wherein the vehicle conveyance robot includes:

a conveyance robot head having front drive wheels, a bed part connected to the conveyance robot head and configured to ascend or descend in a vertical direction, the bed part including a front bed part, and a rear bed part slidingly coupled with the front bed part, wherein the rear bed part has rear drive wheels, a lift link device arranged between the rear drive wheels and the rear bed part, and pairs of wheel support arms configured to swing 90 degrees from retracted positions at both sides of the front bed part and the rear bed part for supporting wheels of the vehicle.

15. The non-transitory computer-readable storage medium according to claim 13, wherein the program further causes the computer to:

manage entry into and exit from an automated parking lot for parking manual driving vehicles and automated driving vehicles;

at a time of entry into the automated parking lot, set a running route for an automated driving vehicle of the automated driving vehicles to move to a set parking space by automated driving, and automatically control the vehicle conveyance robot to convey a manual driving vehicle of the manual driving vehicles to the set parking space, and in response to the automated driving vehicle breaking down and stopping inside the automated parking lot, automatically control the vehicle conveyance robot to unload the manual driving vehicle being conveyed from the vehicle conveyance robot, and load and recover the automated driving vehicle which has broken down on the vehicle conveyance robot, the program further causes the computer to:

monitor a presence of the automated driving vehicle which has broken down and stopped, and in response to recognizing the presence of the automated driving vehicle which has broken down and stopped, automatically control the vehicle conveyance robot to unload the manual driving vehicle being conveyed for lot entry from the vehicle conveyance robot, automatically drive the vehicle conveyance robot to the automated driving vehicle which has broken down, and automatically control the vehicle conveyance robot to load the automated driving vehicle which has broken down on the vehicle conveyance robot, and the program further causes the computer to:

in response to recognizing the presence of the automated driving vehicle which has broken down and stopped, search, among a plurality of vehicle conveyance robots including the vehicle conveyance robot conveying the manual driving vehicles for lot entry, a vehicle conveyance robot present at a position closest to the automated driving vehicle which has broken down and stopped, automatically control the searched vehicle conveyance robot to unload the manual driving vehicle being conveyed by the searched vehicle conveyance robot from the searched vehicle conveyance robot, automatically drive the searched vehicle conveyance robot toward the automated driving vehicle which has broken down, and automatically control the searched vehicle conveyance robot to load the automated driving vehicle which has broken down on the searched vehicle conveyance robot, and the vehicle conveyance robot includes:

a conveyance robot head having front drive wheels, a bed part connected to the conveyance robot head and configured to ascend or descend in a vertical direction, the bed part including a front bed part, and a rear bed part slidingly coupled with the front bed part, wherein the rear bed part has rear drive wheels, a lift link device arranged between the rear drive wheels and the rear bed part, and pairs of wheel support arms configured to swing 90 degrees from retracted positions at both sides of the front bed part and the rear bed part for supporting wheels of the vehicle.

\* \* \* \* \*